US012128967B2

(12) United States Patent
Mori et al.

(10) Patent No.: US 12,128,967 B2
(45) Date of Patent: Oct. 29, 2024

(54) CONTROL APPARATUS FOR AC ROTARY MACHINE AND ELECTRIC POWER STEERING APPARATUS

(71) Applicant: Mitsubishi Electric Corporation, Tokyo (JP)

(72) Inventors: Tatsuya Mori, Tokyo (JP); Kenta Kubo, Tokyo (JP); Itaru Iki, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 17/778,291

(22) PCT Filed: Jan. 15, 2020

(86) PCT No.: PCT/JP2020/000942
§ 371 (c)(1),
(2) Date: May 19, 2022

(87) PCT Pub. No.: WO2021/144867
PCT Pub. Date: Jul. 22, 2021

(65) Prior Publication Data
US 2023/0001979 A1    Jan. 5, 2023

(51) Int. Cl.
*B62D 5/04* (2006.01)
*H02P 27/08* (2006.01)

(52) U.S. Cl.
CPC .......... *B62D 5/046* (2013.01); *B62D 5/0487* (2013.01); *H02P 27/08* (2013.01)

(58) Field of Classification Search
CPC ........ B62D 5/045; B62D 5/0487; H02P 27/08
See application file for complete search history.

(56) References Cited

U.S. PATENT DOCUMENTS

| 2018/0022378 A1 | 1/2018 | Furukawa |
| 2019/0131887 A1 | 5/2019 | Mori et al. |
| 2021/0114652 A1* | 4/2021 | Mori ................. H02P 29/50 |

FOREIGN PATENT DOCUMENTS

JP    6266161 B2    1/2018

OTHER PUBLICATIONS

Extended European Search Report dated Dec. 23, 2022 in Application No. 20913301.6.

(Continued)

*Primary Examiner* — Jacob M Amick
(74) *Attorney, Agent, or Firm* — Sughrue Mion, PLLC; Richard C. Turner

(57) ABSTRACT

To provide a control apparatus for AC rotary machine and an electric power steering apparatus which can reduce the error component of the current detection value close to the mechanical resonance period of AC rotary machine. A control apparatus for AC rotary machine detects currents which flow into three-phase windings at a current detection period which is a first natural number times of a carrier period; calculates current detection values, by performing a current addition processing which adds current detection values detected at this time, and current detection values detected before an addition period which is a second natural number times of the current detection period; and calculates the voltage command values of three-phase based on the current detection values after current addition processing, wherein the second natural number is set to a natural number that the addition period becomes the closest to the half period of the mechanical resonance period.

7 Claims, 18 Drawing Sheets

(56) References Cited

OTHER PUBLICATIONS

International Search Report of PCT/JP2020/000942 dated Mar. 3, 2020 [PCT/ISA/210].

* cited by examiner

CONTROL APPARATUS FOR AC ROTARY MACHINE AND ELECTRIC POWER STEERING APPARATUS

CROSS REFERENCE TO RELATED APPLICATIONS

This application is a National Stage of International Application No. PCT/JP2020/000942, filed Jan. 15, 2020.

TECHNICAL FIELD

The present disclosure relates to a control apparatus for AC rotary machine and an electric power steering apparatus.

BACKGROUND ART

As the conventional control apparatus for AC rotary machine and the electric power steering apparatus, the technology of the patent document 1 is known. In the patent document 1, current is detected based on the output signal of the resistance element for current detection connected in series to the negative electrode side switching device of the inverter. In the technology of the patent document 1, by detecting current at two or more fixed timings in the carrier period, current is obtained so that the error caused by switching noise is not included. And, as shown in FIG. 12, FIG. 13, FIG. 14, FIG. 15, FIG. 16, FIG. 23, FIG. 24, FIG. 25, and FIG. 26 of the patent document 1, the voltage command values of three-phase is offset so that the maximum value of the voltage command values of three-phase coincides with the half value Vdc/2 of the power source voltage.

CITATION LIST

Patent Literature

Patent document 1: JP 6266161 B (claim 1, claim 2, FIG. 12)

SUMMARY OF INVENTION

Technical Problem

In the technology of the patent document 1, the error of current detection can be reduced. However, in the inverter in which the resistance element for current detection is connected in series to the negative electrode side switching device, if the voltage command values of three-phase are offset so that the maximum value of the voltage command values of three-phase coincides with the half value Vdc/2 of the power source voltage, the third order ripple component superimposed on the output torque of AC rotary machine becomes large. Accordingly, in order to reduce the error of current detection, while suppressing the increase in the third torque ripple component, it is necessary to develop a method different from the patent document 1.

By the way, the error component of a frequency close to the mechanical resonance frequency of AC rotary machine out of various frequency included in the error component of the current detection value becomes a noise of AC rotary machine easily. Accordingly, especially, it is desired to reduce the error component of the resonance period included in the current detection value.

Then, the purpose of the present disclosure is to provide a control apparatus for AC rotary machine and an electric power steering apparatus which can reduce the error component of the current detection value close to the mechanical resonance period of AC rotary machine.

Solution to Problem

A control apparatus for AC rotary machine according to the present disclosure that controls an AC rotary machine which has three-phase windings, the control apparatus for AC rotary machine including:
an inverter that is provided with three sets of series circuits in each of which a positive electrode side switching device connected to a positive electrode side of a DC power source and a negative electrode side switching device connected to a negative electrode side of the DC power source are connected in series and a connection node of series connection is connected to the winding of the corresponding phase, corresponding to respective phases of the three-phase;
a current detection circuit that is provided with resistances connected in series to the negative electrode side switching devices of at least two phases; and
a controller that calculates voltage command values of three-phase, and controls on/off the switching devices by comparing each of the voltage command values of three-phase with a carrier wave vibrating at a carrier period,
wherein the controller detects currents flowing into the three-phase windings, based on an output signal of the current detection circuit, at a current detection period which is a first natural number times of the carrier period and at which the negative electrode side switching device is turned on; calculates current detection values after current addition processing, by performing a current addition processing which adds current detection values detected at this time, and current detection values detected before an addition period which is a second natural number times of the current detection period; and calculates the current command values of three-phase based on the current detection values after the current addition processing,
wherein the second natural number is set to a natural number that the addition period becomes the closest to a half period of a mechanical resonance period of the AC rotary machine.

An electric power steering apparatus according to the present disclosure including:
the control apparatus for AC rotary machine;
the AC rotary machine; and
a driving force transmission mechanism that transmits a driving force of the AC rotary machine to a steering device of a vehicle,
wherein the carrier period is set less than or equal to 60 microseconds, and
wherein the mechanical resonance period of the AC rotary machine is within a range from 200 microseconds to 500 microseconds.

Advantage of Invention

The phase of the component of the resonance period of the current detection value is reversed at the half period of the resonance period. Accordingly, the component of the resonance period of the current detection value can be canceled by adding the current detection value detected at this time and the current detection value detected before the half period of the resonance period. According to the control apparatus for AC rotary electric machine or the electric power steering apparatus of the present disclosure, the second natural number is set to a natural number that the addition period becomes the closest to the half period of the mechanical resonant period of the AC rotary machine. Accordingly, the component of the resonance period of the current detection value can be reduced by adding the current detection value detected at this time and the current detection value detected before the addition period. As a result, occurrence of the noise of AC rotary machine can be suppressed.

DETAILED DESCRIPTION OF THE EMBODIMENTS

1. Embodiment 1

Figure 1:
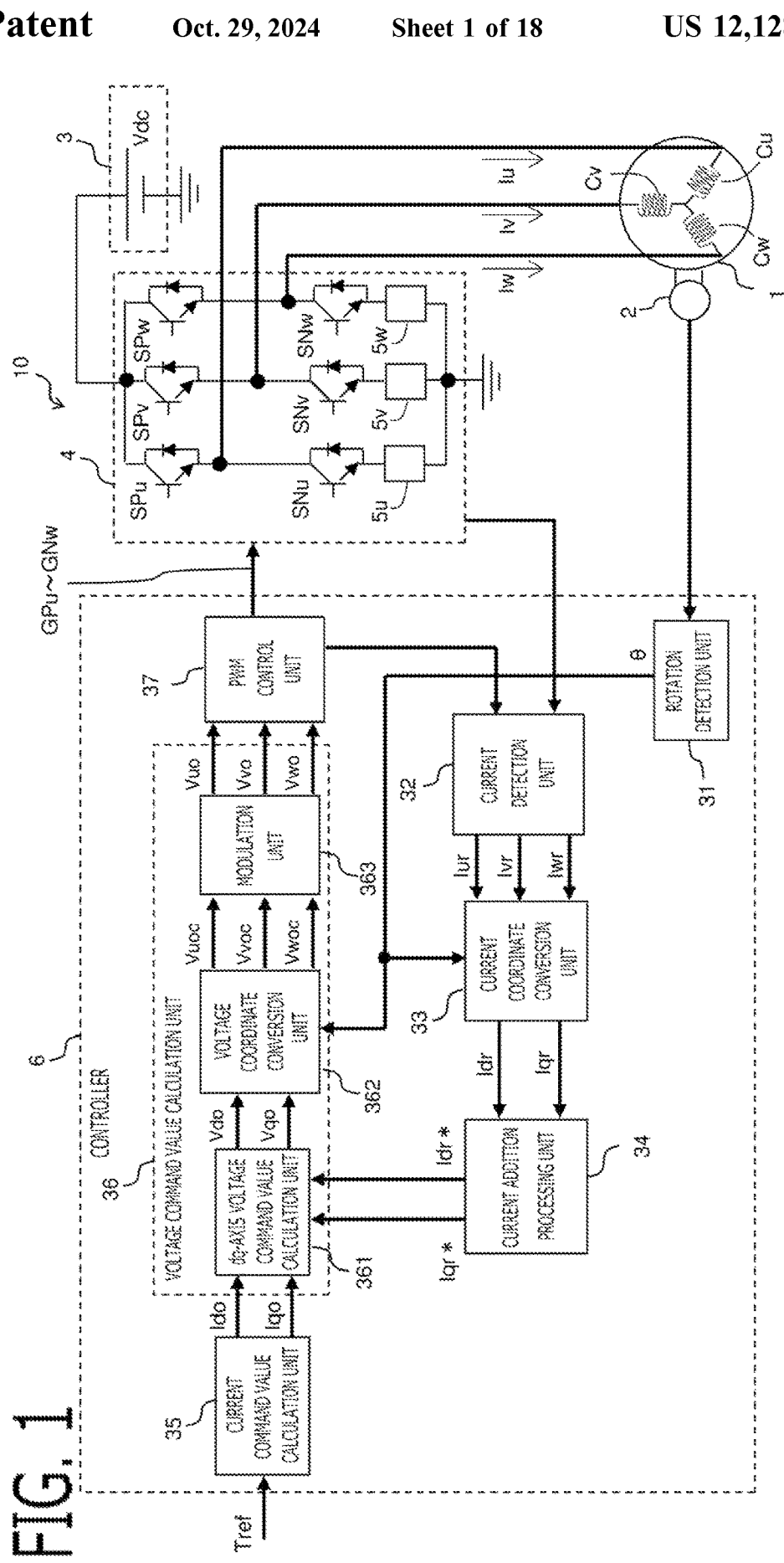
FIG. 1 is a schematic configuration diagram of the AC rotary machine and the controller for AC rotary machine according to Embodiment 1.

A control apparatus for AC rotary machine 10 (hereinafter, referred to simply as the control apparatus 10) according to Embodiment 1 will be explained with reference to drawings. FIG. 1 is a schematic configuration diagram of the AC rotary machine 1 and the control apparatus 10 according to the present embodiment.

1-1. AC Rotary Machine 1

The AC rotary machine 1 is provided with three-phase windings Cu, Cv, Cw of U phase, V phase, and W phase. The AC rotary machine is provided with a stator and a rotor disposed on the radial-direction inner side of the stator. The three-phase windings Cu, Cv, Cw are wound around the stator. In the present embodiment, the AC rotary machine 1 is the permanent magnet type synchronous rotary machine in which the permanent magnet is provided in the rotor. The AC rotary machine 1 may be the field winding type synchronous rotary machine in which the field winding is provided in the rotor, or it may be the induction machine in which the permanent magnet is not provided in the rotor. The three-phase windings may be connected by star connection, or may be connected by delta connection.

The rotor is provided with a rotation detection circuit 2 for detecting a rotational angle of the rotor. Resolver, encoder, or MR sensor is used for the rotation detection circuit 2. An output signal of the rotation detection circuit 2 is inputted into the controller 6.

1-2. Inverter 4

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to respective phase of three-phase. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 6 via a gate drive circuit and the like. The each switching device is turned on or turned off by the switching signals GPu to GNw outputted from the controller 6.

The DC power source 3 outputs a power source voltage Vdc to the inverter 4. The DC power source 3 may be any apparatus which outputs power source voltage Vdc, such as a battery, a DC-DC converter, a diode rectifier, and a PWM rectifier. A voltage sensor which detects the power source voltage Vdc may be provided in the DC power source 3. And, an output signal of the voltage sensor may be inputted into the control apparatus 10. The control apparatus 10 may control using the detected power source voltage Vdc.

1-3. Current Detection Circuit 5

A current detection circuit 5 that is provided with resistances connected in series to the negative electrode side switching devices of at least two phases is provided. In the present embodiment, the current detection circuit 5 detects currents which flows through the negative electrode side switching devices SNu, SNv, SNw of three-phase. The current detection circuit 5 is provided with shunt resistances 5*u*, 5*v*, 5*w* connected in series to the negative electrode side switching device of each phase. The shunt resistance 5*u* of U phase is connected in series to the negative electrode side of the negative electrode side switching device SNu of U phase, the shunt resistance 5*v* of V phase is connected in series to the negative electrode side of the negative electrode side switching device SNv of V phase, and the shunt resistance 5*w* of W phase is connected in series to the negative electrode side of the negative electrode side switching device SNw of W phase. A potential difference between both ends VRu, VRv, VRw of the shunt resistance 5*u*, 5*v*, 5*w* of each phase is inputted into the controller 6.

Each shunt resistance may be connected in series to the positive electrode side of the negative electrode side switching device. The current detection circuit 5 may detect the currents which flow through the negative electrode side switching devices of any two phases. In this case, by utilizing that a total value of the winding currents of three-phase Iu, Iv, Iw becomes 0, the controller 6 may calculate the current of one remaining phase, based on the current detection values of two phases. For example, the current detection circuit 5 may detect the currents Iur, Ivr of U phase and V phase, and the controller 6 may calculate the current Iwr of W phase by Iwr=−Iur−Ivr.

1-4. Controller 6

Figure 2:
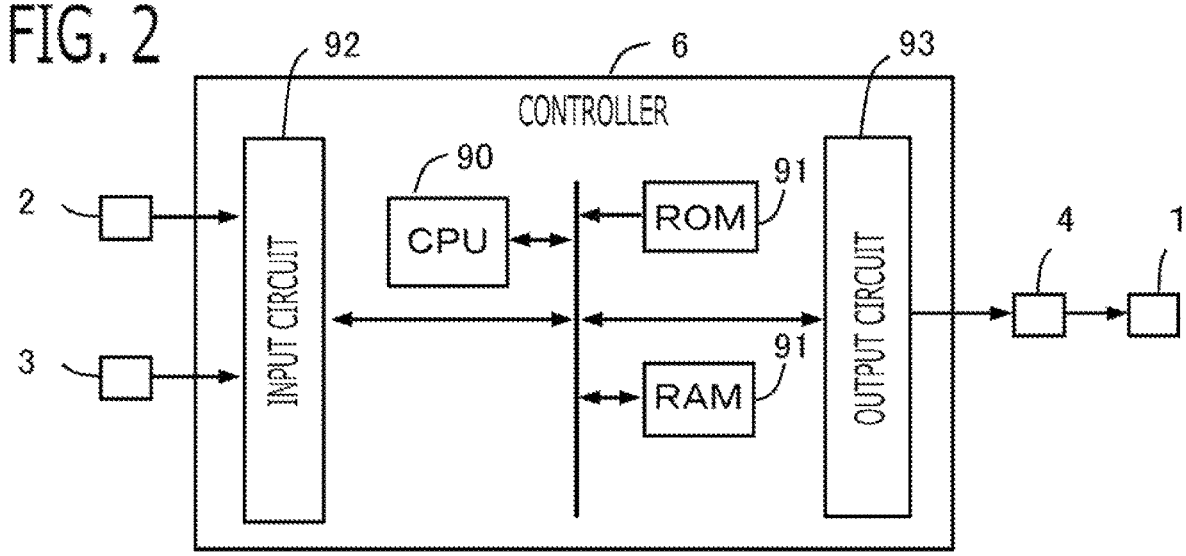
FIG. 2 is a hardware configuration diagram of the control device according to Embodiment 1.

The controller 6 controls the AC rotary machine 1 via the inverter 4. As shown in FIG. 1, the controller 6 is provided with a rotation detection unit 31, a current detection unit 32, a current coordinate conversion unit 33, a current addition processing unit 34, a current command value calculation unit 35, a voltage command value calculation unit 36, a PWM control unit 37, and the like. Respective functions of the controller 6 are realized by processing circuits provided in the controller 6. Specifically, as shown in FIG. 2, the controller 6 is provided, as processing circuits, with an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the rotation detection circuit 2 and the current detection sensor 5, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 6, such as the storage apparatus 91, the input circuit 92, and the output circuit 93, so that the respective functions of the control units 31 to 37 of FIG. 1 provided in the controller 6 are realized. Setting data items such as a gain and a threshold value to be utilized in the control units 31 to 37 are stored, as part of software items (programs), in the storage apparatus 91 such as a ROM. Each function of the controller 6 will be described in detail below.

<Rotation Detection Unit 31>

The rotation detection unit 31 detects a magnetic pole position θ (a rotational angle θ of the rotor) and a rotational angle speed ω of the rotor in an electrical angle. In the present embodiment, the rotation detection unit 31 detects the magnetic pole position θ (the rotational angle θ) and the rotational angle speed ω of the rotor, based on the output signal of the rotation detection circuit 2. The magnetic pole position is set in the direction of the N pole of the permanent magnet provided in the rotor. The rotation detection unit 31 may estimate the rotational angle (the magnetic pole position) without using the rotation sensor, based on current information which are obtained by superimposing a harmonic wave component on the current command value (so-called, sensorless system).

<Current Detection Unit 32>

The current detection unit 32 detects the currents Iur, Ivr, Iwr which flow into the three-phase windings, based on the output signal of the current detection circuit 5. The current detection unit 32 divides the potential difference between both ends of the shunt resistance of each phase, by a resistance value of shunt resistance, and detects the current Iur, Ivr, Iwr of the winding of each phase.

Since the current detection circuit 5 detects the current which flows through the negative electrode side switching device, the current detection unit 32 detects current at the timing when the negative electrode side switching device become ON. In the PWM control unit 37 described below, the negative electrode side switching device is turned on at every the carrier period Tc. Accordingly, the current detection unit 32 detects the currents Iur, Ivr, Iwr of the three-phase windings, based on the output signal of the current detection circuit 5, at a current detection period TIdt (=A× Tc) which is a first natural number A times of the carrier period Tc and at which the negative electrode side switching device is turned on. In the present embodiment, the current detection circuit 5 detects the currents at the timing when the carrier wave CA becomes the peak point of mountain of every the current detection period TIdt.

<Current Coordinate Conversion Unit 33>

The current coordinate conversion unit 33 converts the current detection values of the three-phase windings Iur, Ivr, Iwr into a current detection value of d-axis Idr and a current detection value of q-axis Iqr on a coordinate system of d-axis and q-axis at every current detection. The coordinate system of d-axis and q-axis is a two-axis rotating coordinate system which rotates synchronizing with the magnetic pole position of the rotor. The d-axis is defined in the direction of the magnetic pole position θ (N pole), and the q-axis is defined in the direction advanced to the d-axis by 90 degrees in the electrical angle. Specifically, the current coordinate conversion unit 33 converts the current detection values of three-phase Iur, Ivr, Iwr into the current detection value of d-axis Idr and the current detection value of q-axis Iqr, by performing a three-phase/two-phase conversion and a rotating coordinate conversion based on the magnetic pole position θ.

<Current Addition Processing Unit 34>

As described in detail later, the current addition processing unit 34 calculates current detection values after current addition processing, by performing a current addition processing to the current detection value at every current detection. In the present embodiment, the current addition processing unit 34 calculates current detection values of d-axis and q-axis after current addition processing Idr*, Iqr*, by performing the current addition processing to the current detection values of d-axis and q-axis Idr, Iqr.

<Current Command Value Calculation Unit 35>

The current command value calculation unit 35 calculates a current command value of d-axis Ido and a current command value of q-axis Iqo. In the present embodiment, the current command value calculation unit 35 calculates the current command values of d-axis and q-axis Ido, Iqo, based on a torque command value Tref, the power source voltage Vdc, the rotational angle speed ω, and the like. According to well-known current vector control methods, such as the maximum torque/current control, the maximum torque voltage control, the magnetic flux weakening control, and the Id=0 control, the current command values of d-axis and q-axis Ido, Iqo are calculated. For example, when the Id=0 control is performed, the current command value of d-axis Ido is set to zero (Ido=0), and the current command value of q-axis Iqo is set to a value obtained by multiplying a conversion coefficient to the torque command value Tref. The torque command value Tref may be calculated in the controller 6, and may be transmitted from an external controller.

<Voltage Command Value Calculation Unit 36>

The voltage command value calculation unit 36 changes the voltage command values of three-phase Vuo, Vvo, Vwo at every current detection so that current detection values approach the current command values. In the present embodiment, the voltage command value calculation unit 36 is provided with a dq-axis voltage command value calculation unit 361, a voltage coordinate conversion unit 362, and a modulation unit 363.

The dq-axis voltage command value calculation unit 361 performs a current feedback control that changes a voltage command value of d-axis Vdo and a voltage command value of q-axis Vqo by PI control or the like, so that the current detection value of d-axis after current addition processing Idr* approaches the current command value of d-axis Ido, and the current detection value of q-axis after current addition processing Iqr* approaches the current command value of q-axis Iqo. Feedforward control for non-interfering between the d-axis current and the q-axis current and the like may be performed.

The voltage coordinate conversion unit 362 converts the voltage command values of dq-axis Vdo, Vqo into voltage command values of three-phase after coordinate conversion Vuoc, Vvoc, Vwoc, by performing a fixed coordinate conversion and a two-phase/three-phase conversion based on the rotational angle θ. This voltage command values of three-phase after coordinate conversion Vuoc, Vvoc, Vwoc become sine waves.

The modulation unit 363 calculates the final voltage command values of three-phase Vuo, Vvo, Vwo by adding modulation to the voltage command values of three-phase after coordinate conversion Vuoc, Vvoc, Vwoc of sine waves. The modulation unit 363 adds an amplitude reduction modulation which reduces the amplitudes of the voltage command values of three-phase, to the voltage command values of three-phase after coordinate conversion, while maintaining the line voltages of the voltage command values of three-phase.

In the present embodiment, the modulation unit 363 adds the amplitude reduction modulation which offsets the voltage command values of three-phase equally so that an average value of the voltage command values of three-phase becomes less than a vibration center value of carrier wave CA. As shown in the next equation, the modulation unit 363 determines the minimum value Vmin of the voltage command values of three-phase after coordinate conversion Vuoc, Vvoc, Vwoc; calculates an offset voltage Voff by adding the half value of the power source voltage Vdc to the minimum value Vmin; and calculates the voltage command values of three-phase Vuo, Vvo, Vwo by subtracting the offset voltage Voff from the voltage command values of three-phase after coordinate conversion Vuoc, Vvoc, Vwoc.

$$V\min = \mathrm{MIN}(Vuoc, Vvoc, Vwoc)$$

$$V\mathrm{off} = 0.5 \times Vdc + V\min$$

$$Vuo = Vuoc - V\mathrm{off}$$

$$Vvo = Vvoc - V\mathrm{off}$$

$$Vwo = Vwoc - V\mathrm{off} \quad (1)$$

Figure 3:
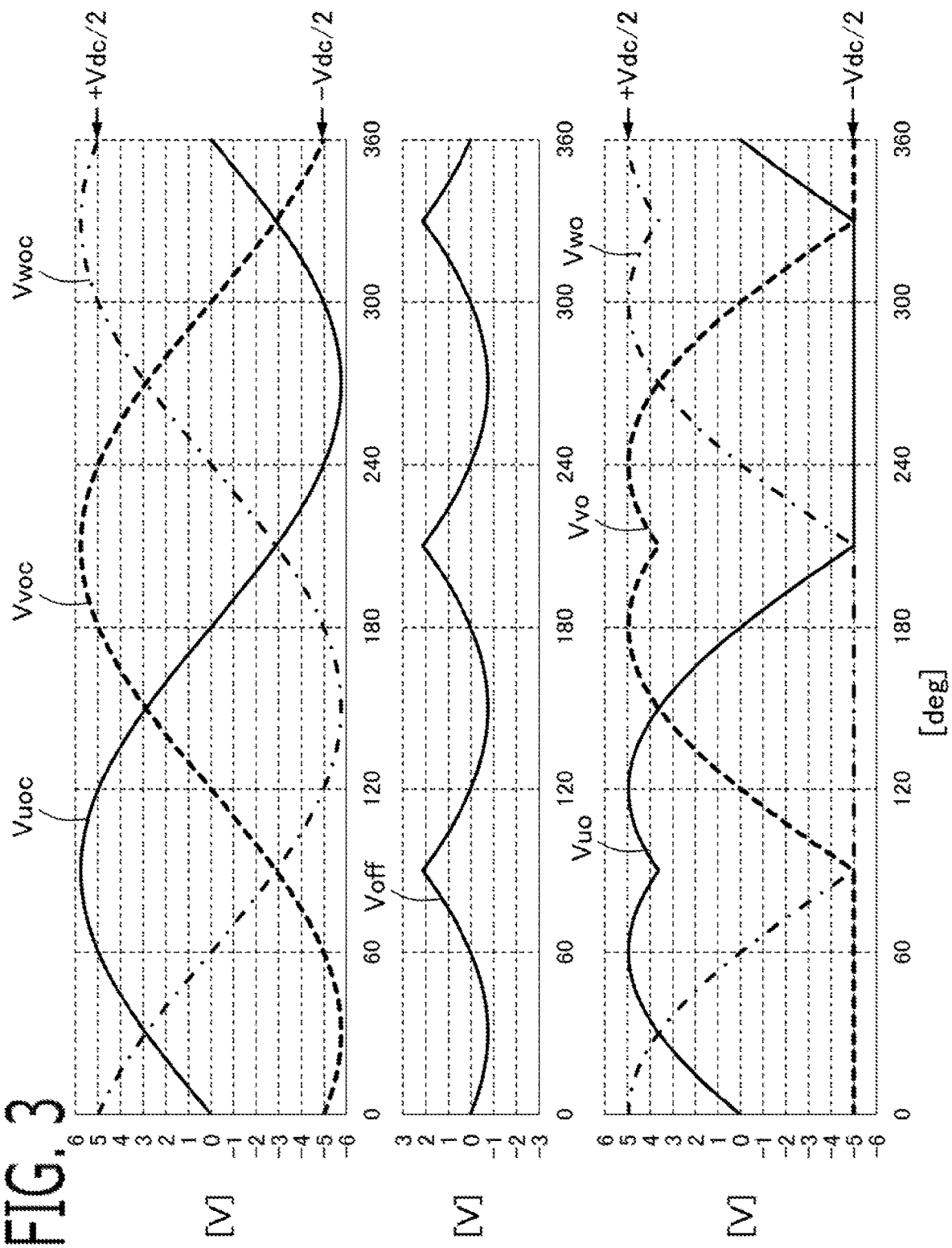
FIG. 3 is a time chart which shows the behavior of the voltage command values of three-phase by the amplitude reduction modulation according to Embodiment 1.

A behavior of the amplitude reduction modulation of the equation (1) is shown in FIG. 3. The voltage command values of three-phase after coordinate conversion Vuoc, Vvoc, Vwoc are shown in the upper row graph. The voltage command values of three-phase after coordinate conversion Vuoc, Vvoc, Vwoc exceed a range from −Vdc/2 to +Vdc/2, and the voltage saturation occurs. On the other hand, in the voltage command values of three-phase after amplitude reduction modulation Vuo, Vvo, Vwo, the voltage command value of a phase whose voltage is the minimum is offset so as to coincide with −Vdc/2, and occurrence of the voltage saturation can be prevented.

<Difference in Torque Fluctuation According to Modulation Method>

Figure 4:
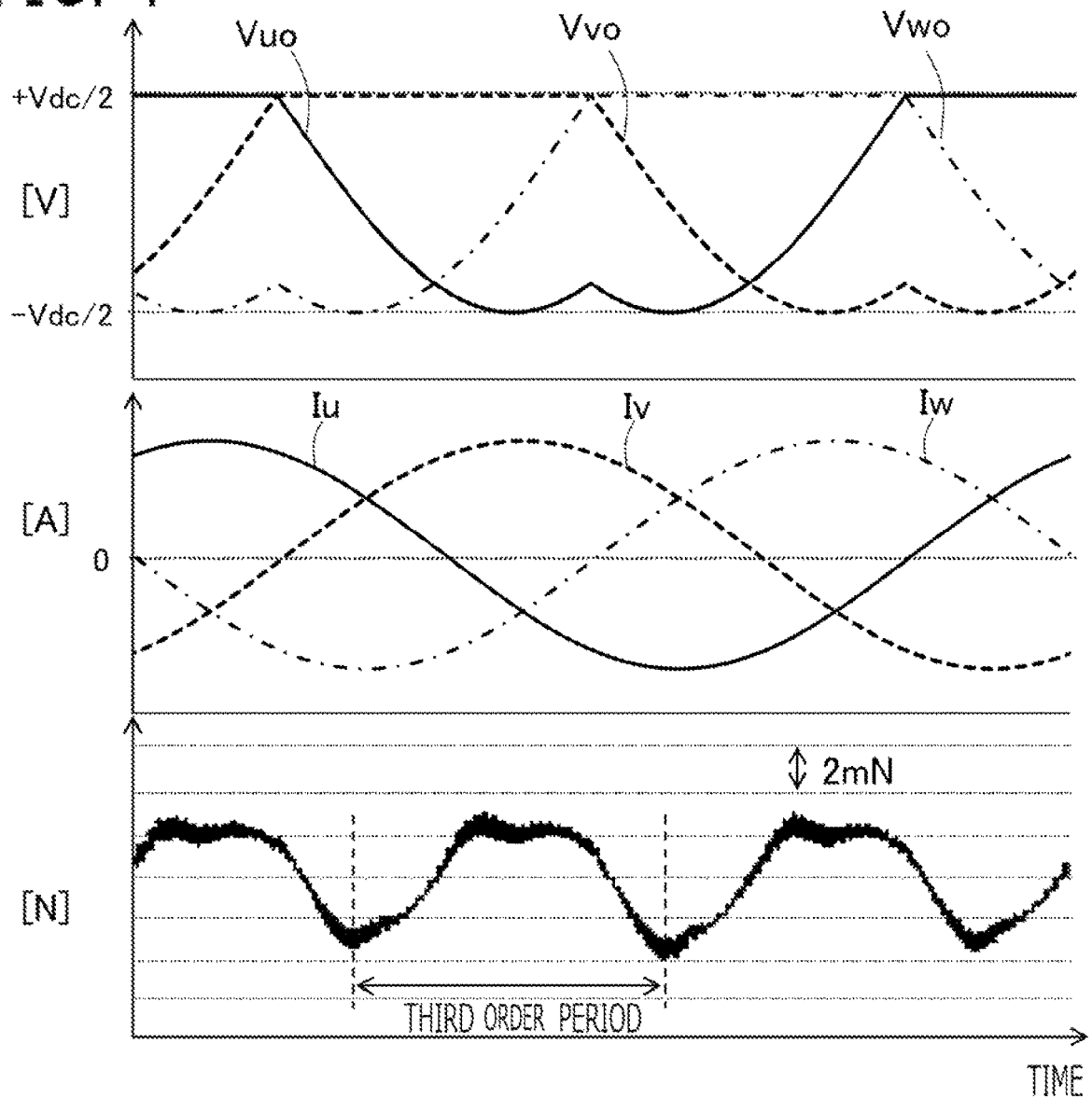
FIG. 4 is a time chart which shows the behavior of the output torque by the amplitude reduction modulation according to the comparative example.
Figure 5:
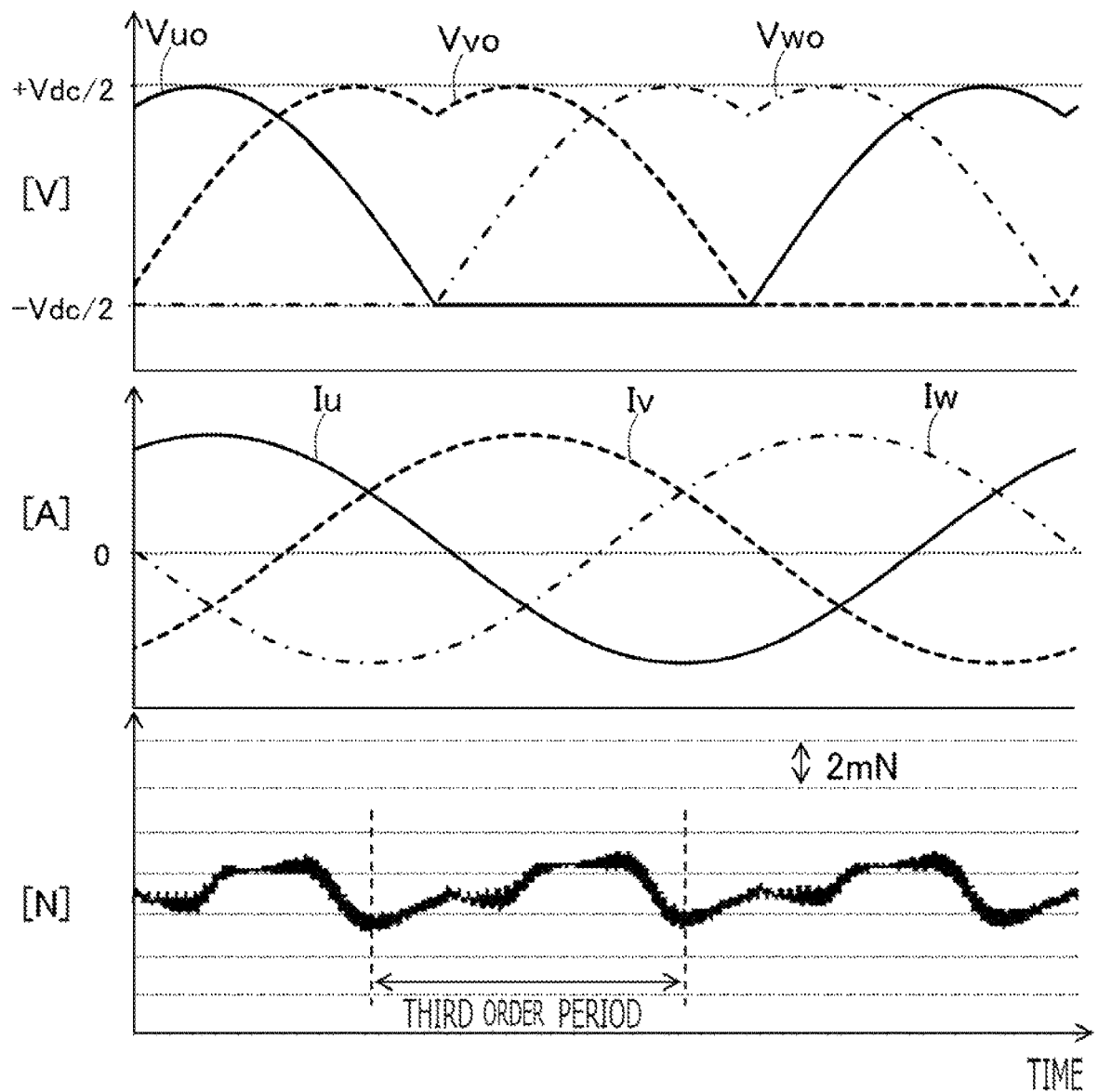
FIG. 5 is a time chart which shows the behavior of the output torque by the amplitude reduction modulation according to Embodiment 1.

FIG. 4 shows a behavior of the output torque of the comparative example in which the voltage command value of a phase whose voltage is the maximum is offset so as to coincide with +Vdc/2 like the patent document 1. On the other hand, FIG. 5 shows a behavior of the output torque of the present embodiment in which the voltage command value of a phase whose voltage is the minimum is offset so as to coincide with −Vdc/2. In FIG. 4 and FIG. 5, the upper row graph shows the voltage command values of three-phase after modulation Vuo, Vvo, Vwo. The middle graph shows the three-phase currents Iu, Iv, Iw which flow into three-phase winding. The lower row graph shows the output torque of AC rotary machine 1.

In the comparative example of FIG. 4 and the present embodiment of FIG. 5, the third order ripple component is superimposed on the output torque. However, the amplitude of the third order ripple component of the comparative example of FIG. 4 becomes about three times of the amplitude of the present embodiment. This is because, in the inverter in which the shunt resistance is connected in series to the negative electrode side switching device like the present embodiment, the voltage drop in the inverter when the negative electrode side switching device is turned on becomes larger than the voltage drop in the inverter when the positive electrode side switching device is turned on, and both become unbalance. Although detailed explanation is omitted, due to this unbalance, as a result, the amplitude of the third order ripple component becomes larger in the comparative example like the patent document 1. Accordingly, the modulation method of the present embodiment is desirable. However, as described later, in the modulation method of the present embodiment, there is the case where the on period of the negative electrode side switching device becomes short, and the current detection error due to ringing is caused. Accordingly, its countermeasure is taken by the current addition processing.

<PWM Control Unit 37>

The PWM control unit 37 controls on/off switching devices by comparing each of the voltage command values of three-phase Vuo, Vvo, Vwo and the carrier wave CA which vibrates at the carrier period Tc. The carrier wave CA is a triangular wave which vibrates centering on 0 at the carrier period Tc with the amplitude of half value Vdc/2 of the power source voltage.

Figure 6:
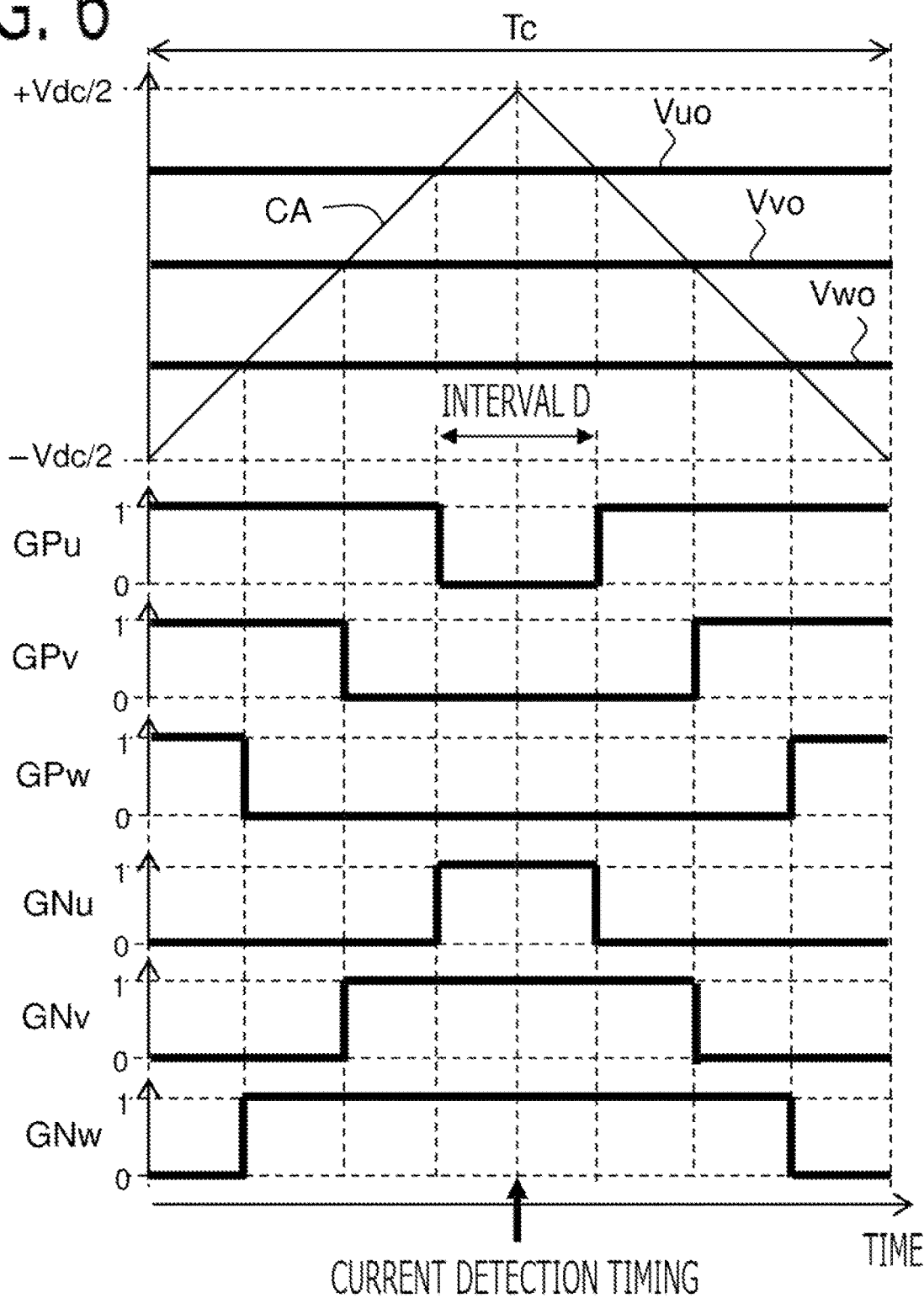
FIG. 6 is a time chart explaining the PWM control behavior and the current detection timing according to Embodiment 1.

As shown in FIG. 6, about each phase, the PWM control unit 37 turns on the switching signal GP of the positive electrode side switching device (in this example, 1) and turns on the positive electrode side switching device when carrier wave CA is less than voltage command value, and turns off the switching signal GP of the positive electrode side switching device (in this example, 0) and turns off the positive electrode side switching device when the carrier wave CA exceeds the voltage command value. On the other hand, about each phase, the PWM control unit 37 turns off the switching signal GN of the negative electrode side switching device (in this example, 0) and turns off the negative electrode side switching device when the carrier wave CA is less than voltage command value, and turns on the switching signal GN of the negative electrode side switching device (in this example, 1) and turns on the negative electrode side switching device when the carrier wave CA exceeds the voltage command value. About each phase, between the on period of the positive electrode side switching device and the on period of the negative electrode side switching device, the short circuit prevention period (dead time) which turns off both of the positive electrode side and the negative electrode side switching device may be provided.

As shown in FIG. 6, in the interval D centering on the peak point of mountain of the carrier wave CA, the negative electrode side switching signals GNu, GNv, GNw of all three-phases are turned on. In this interval D, the currents which flow into the three-phase windings can be detected by the current detection circuit 5. In the present embodiment, as mentioned above, the current detection unit 32 detects the currents at the timing of the peak point of mountain of the carrier wave CA. In the example of FIG. 6, the first natural number A is set to 1, the current detection period TIdt is set to one time of the carrier period Tc, and the currents are detected at the peak point of mountain of all the carrier wave CA.

Figure 7:
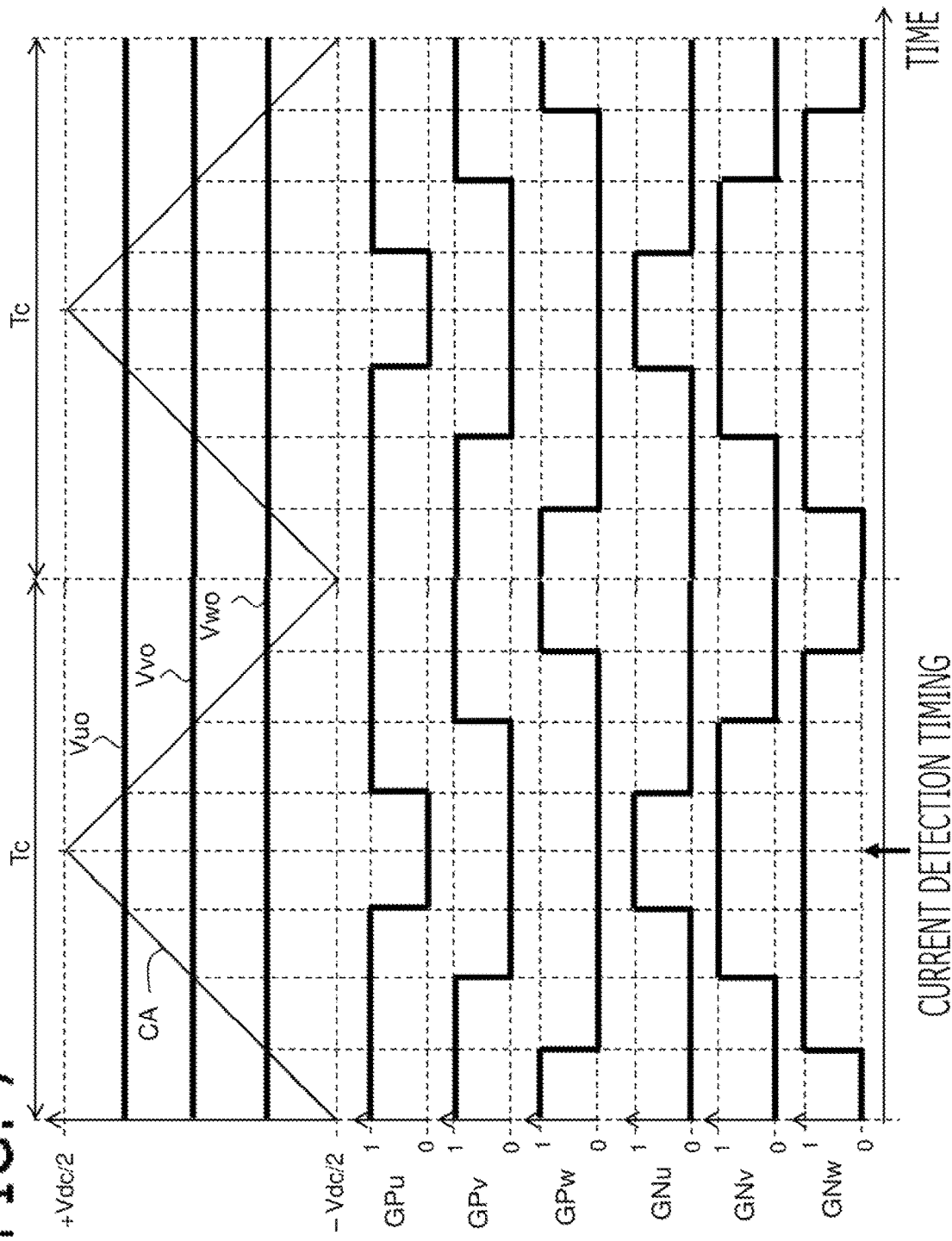
FIG. 7 is a time chart explaining the PWM control behavior and the current detection timing according to Embodiment 1.

Alternatively, as shown in FIG. 7, the first natural number A is set to 2, the current detection period TIdt is set to two times of the carrier period Tc, and the currents may be detected at the peak point of mountain of every other carrier waves CA.

<Detection Error of Current Due to Ringing>

Figure 8:
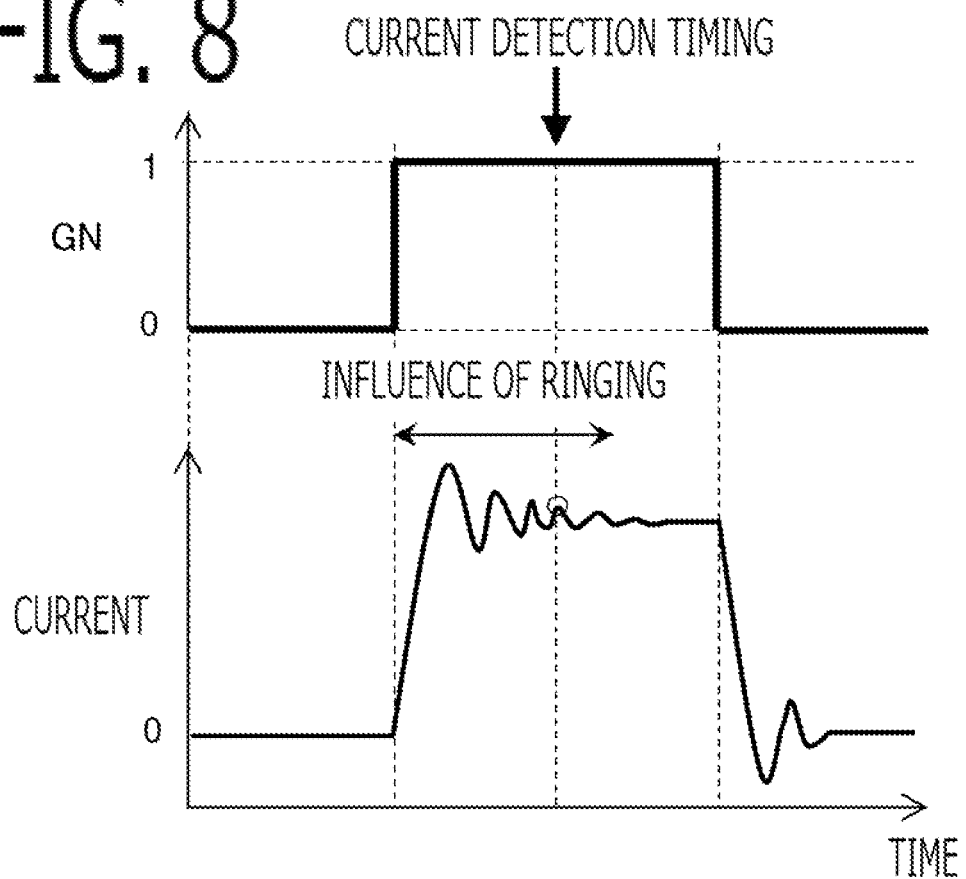
FIG. 8 is a time chart for explaining the influence of ringing according to Embodiment 1.

As shown in FIG. 8, immediately after turning on the switching device, the phenomenon called ringing in which current vibrates occurs. Ringing which occurred in any one phase also affects currents of other phases. For example, ringing occurs for several microseconds after turning on the switching device. As the voltage command value becomes large, the on period of the negative electrode side switching device becomes short. If the on period becomes shorter than the double value of the occurrence period of ringing, the detection timing of current overlaps with ringing and the detection error occurs in the current detection value of each phase.

Figure 9:
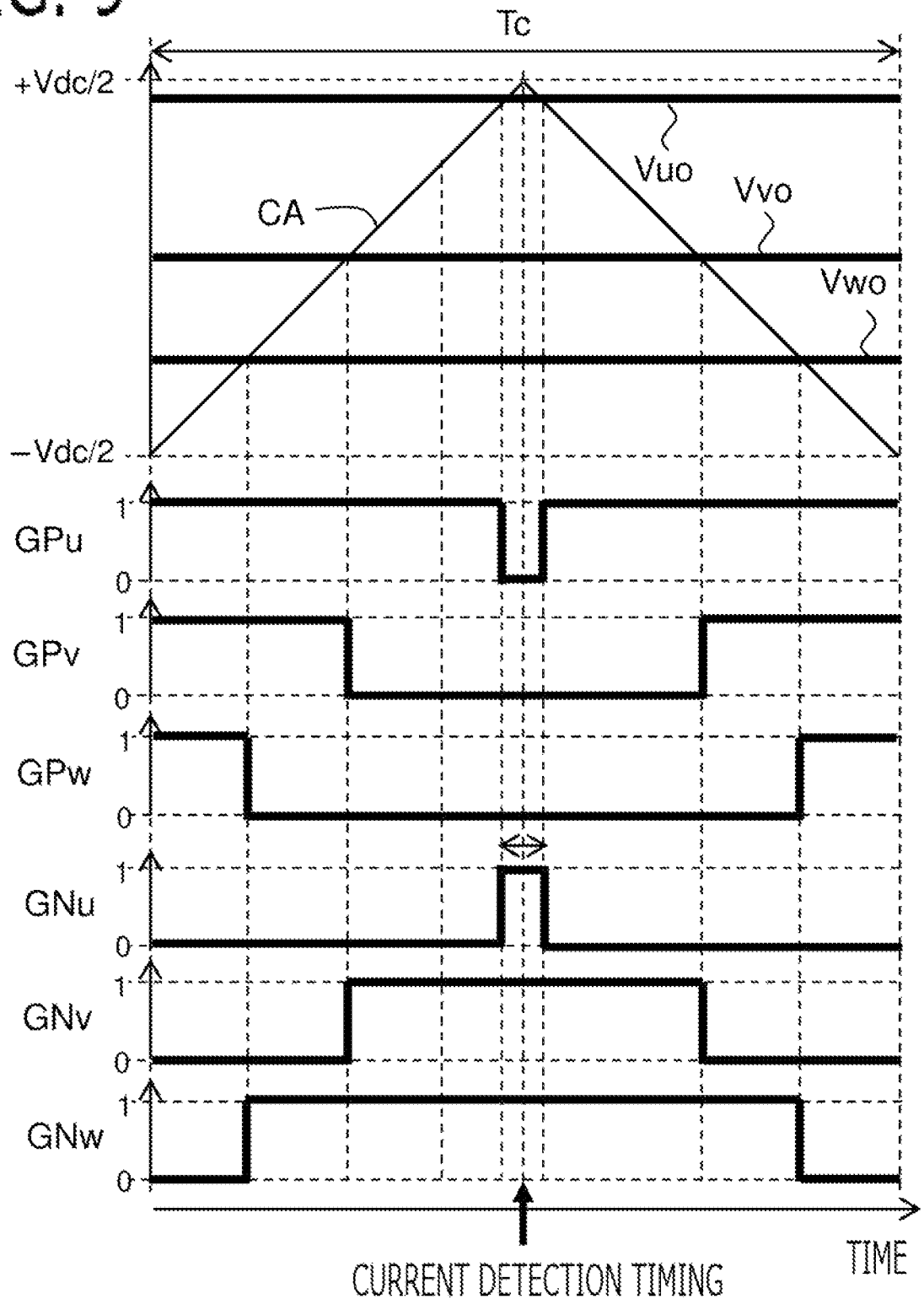
FIG. 9 is a time chart explaining the PWM control behavior and the current detection timing when the influence of ringing occurs according to Embodiment 1.

For example, in the example of FIG. 9, the voltage command value Vuo of U phase becomes a large value close to the half value Vdc/2 of the power source voltage. As a result, the on period of the negative electrode side switching signal GNu of U phase becomes short, and the detection error due to ringing occurs in the current detection value of U phase Iur. Also in the current detection values of other V phase and W phase Ivr, Iwr, the detection error occurs due to the influence of ringing of the current of U phase.

When the on period of the negative electrode side switching device of any one phase is shorter than a preliminarily set threshold value (for example, 5 microseconds), the current detection unit 32 may calculate the current detection value of one phase in which the on period became shorter than the threshold value, based on the current detection value of other two phases. For example, when the on period of the negative electrode side switching signal GNu of U phase is shorter than the threshold value, the current detection value of U phase Iur may be calculated by Iur–Ivr–Iwr. In this case, since the detection error due to ringing occurs also in the current detection values of other two phases, the detection error due to ringing cannot be zero.

Figure 10:
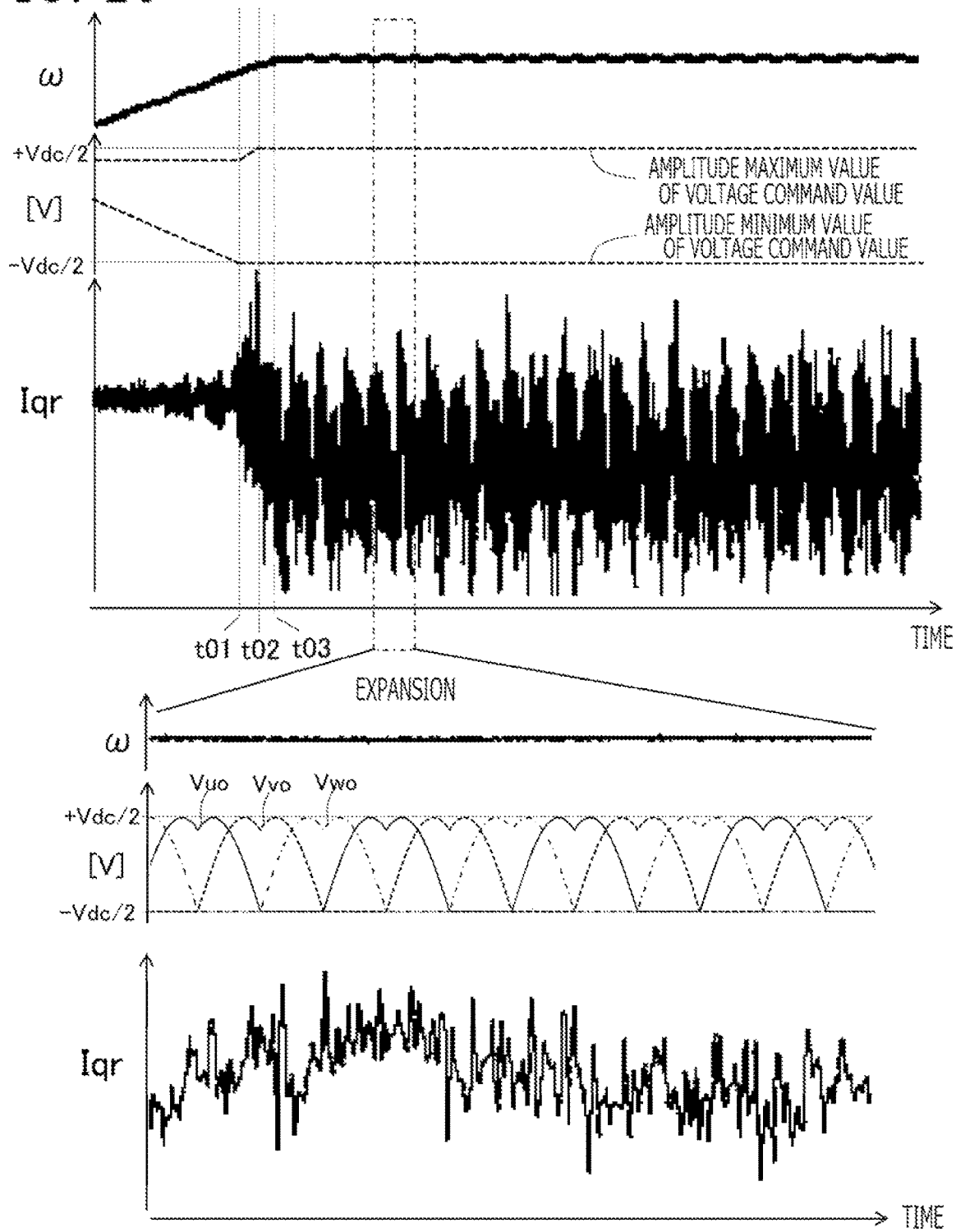
FIG. 10 is a time chart which shows the control behavior when not performing the current addition processing according to the comparative example.

FIG. 10 shows the control behavior of the comparative example which does not perform the current addition processing by the current addition processing unit 34. As the rotational angle speed increases, the amplitudes of the voltage command values of three-phase increase. Until the time t01, the amplitude maximum value of the voltage command values of three-phase is lower than the half value Vdc/2 of the power source voltage, the current detection error due to the influence of ringing does not occur, and the noise component is hardly generated in the current detection value of q-axis Iqr. From the time t01 to the time t02, as the amplitude maximum values of the voltage command values of three-phase approaches the half value Vdc/2 of the power source voltage, the current detection error due to the influence of ringing increases gradually, and the noise component of the current detection value of q-axis Iqr increases gradually.

After the time t03, in order to observe the generation behavior of noise, the increase in the rotational angle speed is stopped and the constant condition is set. The figure that expanded the predetermined period after the time t03 is shown in the down side. As shown in this figure, the maximum value of the voltage command values of three-phase after modulation reaches the half value Vdc/2 of the power source voltage, the period when the on period of the negative electrode side switching device becomes short occurs, and the current detection error due to ringing occurs. As a result, the noise component of the current detection value of q-axis Iqr obtained by performing the coordinate conversion of the current detection values of three-phase becomes large. Although not shown, the noise component of the current detection value of d-axis Idr becomes large similarly.

Then, if the current feedback control is performed using the current detection values of d-axis and q-axis Idr, Iqr on which the noise component is superimposed, a noise component is superimposed on the voltage command values of three-phase Vuo, Vvo, Vwo, and a ripple component is superimposed on the output torque of AC rotary machine 1.

The next (A) and (B) can be considered as countermeasures to this noise component of the current detection value due to ringing. (A) Lowering the response speed of the current feedback control of dq-axis, lowering the sensitivity to the noise component of the current detection values of d-axis and q-axis Idr, Iqr, and preventing the noise component from being superimposed on the voltage command values of three-phase. (B) As shown in FIG. 4, in opposition to the present embodiment, adding the modulation which coincides the voltage command value of the maximum phase of the voltage command values of three-phase after coordinate conversion Vuoc, Vvoc, Vwoc with the half value Vdc/2 of the power source voltage.

In the countermeasure (A), since the following performance of the current feedback control will be deteriorated if the response speed of the current feedback control is lowered, it cannot be selected. In the countermeasure (B), in the period when the voltage command values of three-phase coincides with Vdc/2, since the negative electrode side switching device always becomes OFF, ringing does not occur. However, as mentioned above, in the inverter in which the shunt resistance is connected in series to the negative electrode side switching device, since the third torque ripple component becomes large, it cannot be selected.

<Mechanical Resonance Period of AC Rotary Machine, and Noise Component of Current Detection Value>

Figure 11:
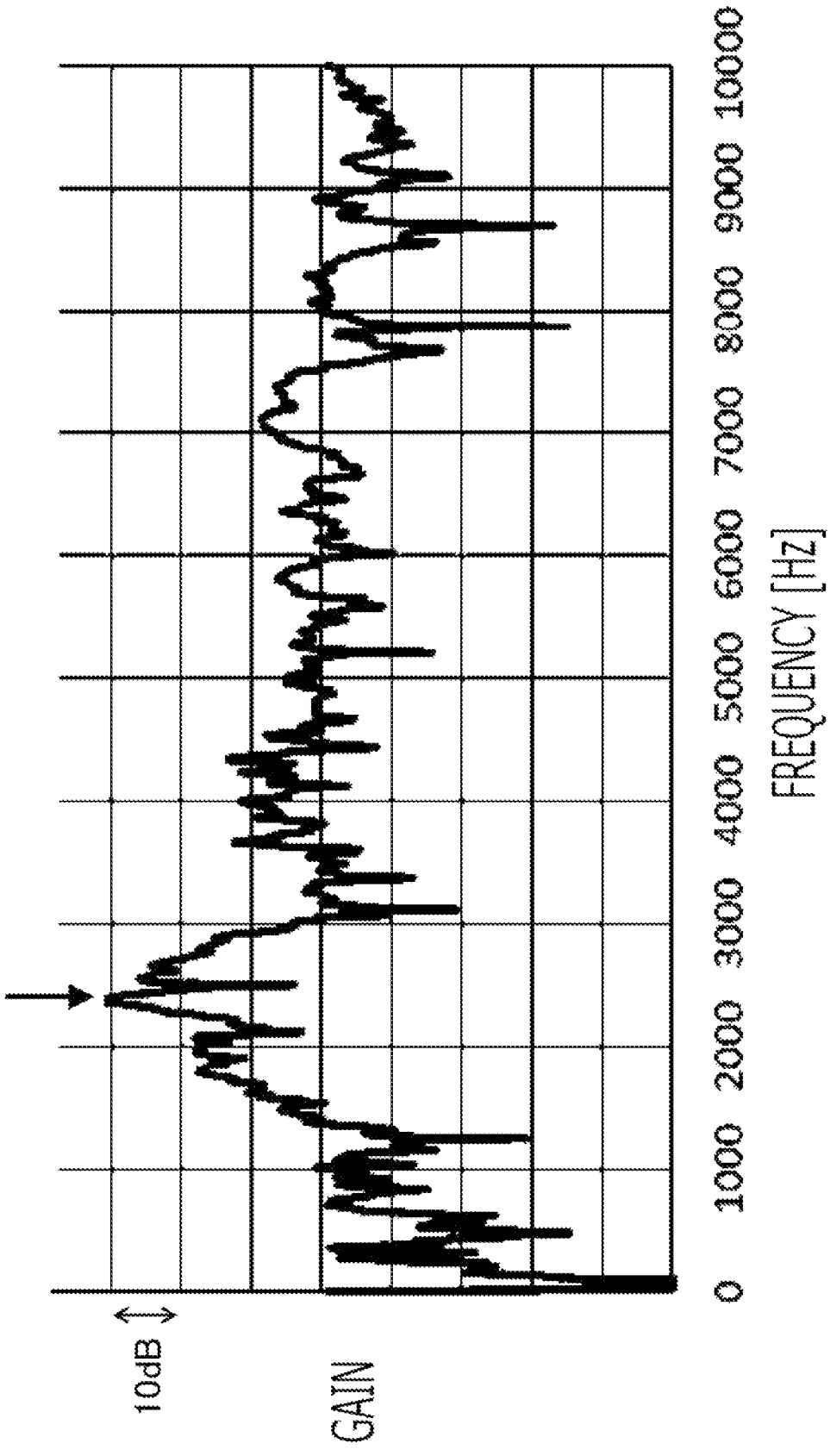
FIG. 11 is a figure showing the frequency characteristic of the noise of AC rotary machine according to Embodiment 1.

Accordingly, in the present embodiment, not the countermeasures (A) and (B) but the current addition processing of the current addition processing unit 34 is performed. FIG. 11 shows the measurement result of sensitivity characteristic of the noise of AC rotary machine 1 with respect to the noise component of current. As the gain of vertical axis becomes large, the noise of AC rotary machine 1 becomes large with respect to the amplitude of the noise component of current. In this AC rotary machine 1, the peak exists in vicinity of 2500 Hz. This is because the mechanical resonance frequency of the frame of AC rotary machine 1 is the vicinity of 2500 Hz (the resonance period Tr is 400 microseconds).

The mechanical resonance of AC rotary machine 1 occurs in the frame of AC rotary machine 1, or the power pack which integrated the AC rotary machine 1, the inverter 4, and the controller 6, or the power apparatus which includes the frame or the power pack, and the gear mechanism, or the like.

Out of various frequency included in the noise component of the current detection value, the noise component of the frequency close to the mechanical resonance frequency of AC rotary machine 1 becomes the noise of AC rotary machine 1 easily. Accordingly, it is desired to reduce the component of the mechanical resonance period Tr of AC rotary machine 1 included in the current detection value.

<Current Addition Processing>

Figure 12:
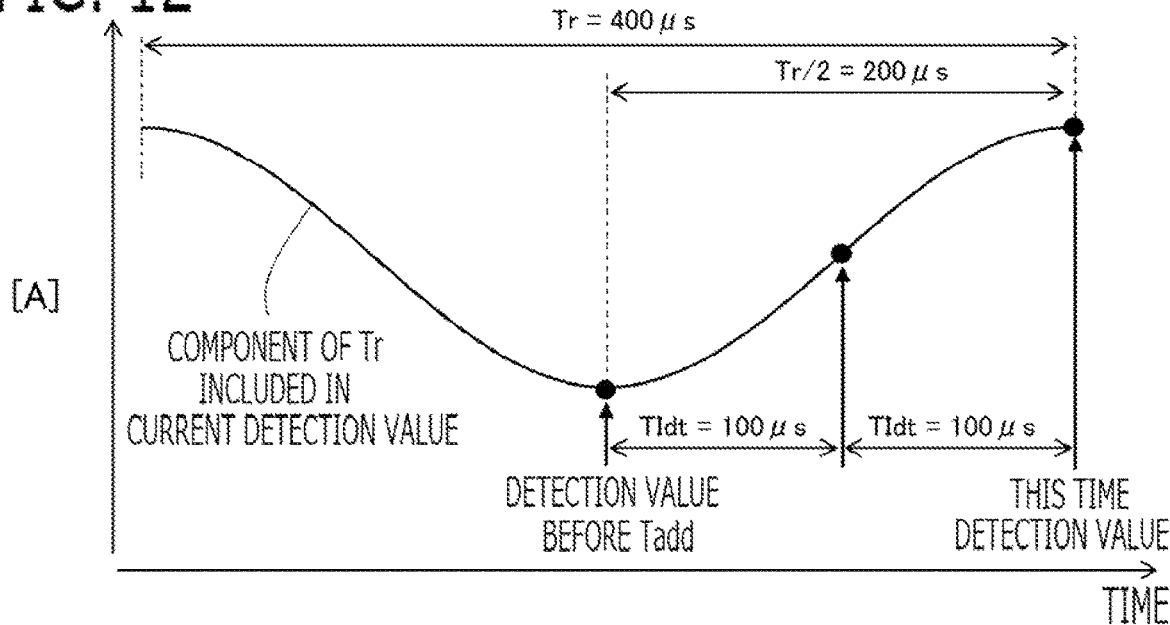
FIG. 12 is a time chart explaining the component of the resonance period included in the current detection value and the addition period according to Embodiment 1.

The principle of the current addition processing will be explained. FIG. 12 shows the schematic waveform of the component of the resonance period Tr included in the current detection value. The phase of the component of the resonance period Tr of the current detection value is reversed at the half period Tr/2 of the resonance period. Accordingly, the component of the resonance period Tr of the current detection value can be canceled by adding the current detection value detected at this time and the current detection value detected before the half period Tr/2 of the resonance period.

Then, the current addition processing unit 34 calculates current detection values after current addition processing, by performing the current addition processing which adds the current detection values detected at this time and the current detection values detected before the addition period Tadd (=B×TIdt) which is a second natural number B times of the current detection period TIdt. The second natural number B is set to a natural number that the addition period Tadd becomes the closest to the half period Tr/2 of the mechanical resonance period of AC rotary machine 1.

Ideally, although the second natural number B may be set to a natural number that the addition period Tadd coincides with the half period Tr/2 of the resonance period, it is necessary to change the carrier period Tc if it does not coincide. As described above, if the second natural number B is set to a natural number that the addition period Tadd becomes the closest to the half period Tr/2 of the resonance period, according to the closeness between the addition period Tadd and the half period Tr/2 of the resonance period, the reduction effect of the component of the resonance period Tr of the current detection value can be obtained.

In order to obtain the reduction effect, as shown in the next equation, the addition period Tadd may be set between ¼ period of the resonance period Tr/4 and ¾ period of the resonance period Tr×¾.

$$Tr/4 < Tadd < Tr \times 3/4 \tag{2}$$

For example, as shown in the next equation, if the resonance period Tr is 400 microseconds, the carrier period Tc is 50 microseconds, the first natural number A is 2, and the current detection period TIdt is 100 microseconds, the second natural number B is set to 2, and the addition period Tadd is set to 200 microseconds which coincide with the half period 200 microseconds of the resonance period. The addition period Tadd may not coincide with the half period Tr/2 of the resonance period.

$Tr$=400 microseconds $Tc$=50 microseconds $TIdt = A \times Tc = 2 \times 50$ microsecond=100 microseconds $$Tadd = B \times TIdt = 2 \times 100 \text{ microsecond} = 200 \text{ microseconds} \tag{3}$$

In the present embodiment, the current addition processing unit 34 calculates current detection values of d-axis and q-axis after current addition processing Idr*, Iqr*, by performing the current addition processing which adds the current detection values of d-axis and q-axis Idr, Iqr calculated at this time current detection and the current detection values of d-axis and q-axis Idr, Iqr calculated at the current detection before the addition period Tadd, respectively.

In the present embodiment, as shown in the next equation, the current addition processing unit 34 calculates an addition value of d-axis current SIdr, by adding the current detection value of d-axis Idr calculated at this time current detection and the current detection value of d-axis Idr calculated at the current detection before the addition period Tadd, and calculates the current detection value of d-axis after current addition processing Idr*, by multiplying 0.5 to the addition value of d-axis current SIdr. As shown in the next equation, the current addition processing unit 34 calculates an addition value of q-axis current SIqr, by adding the current detection value of q-axis Iqr calculated at this time current detection and the current detection value of q-axis Iqr calculated at the current detection before the addition period Tadd, and calculates the current detection value of q-axis after current addition processing Iqr*, by multiplying 0.5 to the addition value of q-axis current SIqr.

$$SIdr(t)=Idr(t)+Idr(t-Tadd)$$

$$Idr^*(t)=0.5\times SIdr(t)$$

$$SIqr(t)=Iqr(t)+Iqr(t-Tadd)$$

$$Iqr^*(t)=0.5\times SIqr(t) \quad (4)$$

Although the component of the double period of the addition period Tadd is canceled by the current addition processing, components other than the double period of the addition period Tadd double. Accordingly, by multiplying 0.5 to the addition value, the current detection values of d-axis and q-axis Idr*, Iqr* in which the component of the double period of the addition period Tadd set corresponding to the resonance period Tr was reduced can be calculated.

Figure 13:
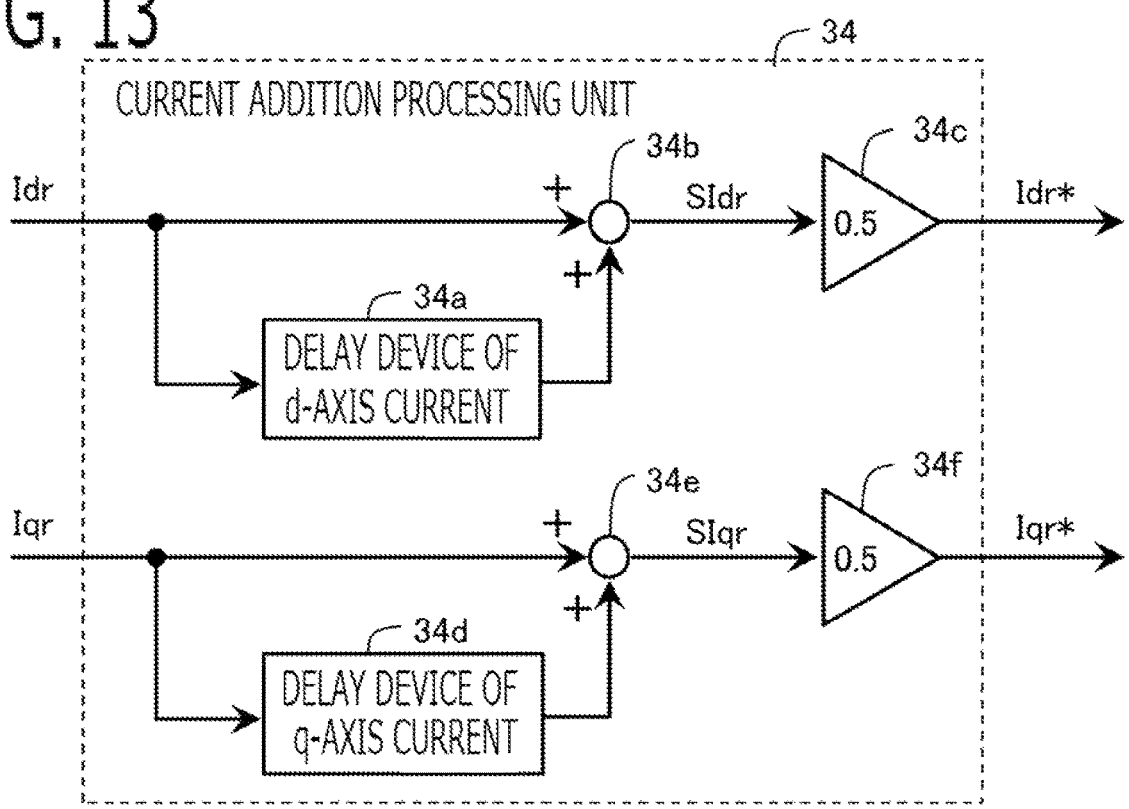
FIG. 13 is a block diagram of the current addition processing unit according to Embodiment 1.

In the present embodiment, as shown in FIG. 13, the current addition processing unit 34 is provided with a delay device of d-axis current 34a, an adder of d-axis current 34b, a gain multiplier of d-axis current 34c, a delay device of q-axis current 34d, an adder of q-axis current 34e, and a gain multiplier of q-axis current 34f. The current addition processing unit 34 is a discrete controller which operates every current detection period TIdt, and the calculation period is the current detection period TIdt.

The current detection value of d-axis Idr detected at this time calculation period (the current detection period TIdt) is inputted into the delay device of d-axis current 34a and the adder of d-axis current 34b. The delay device of d-axis current 34a delays the inputted current detection value of d-axis Idr by the addition period Tadd and outputs. The delay device of d-axis current 34a is provided with delay devices of the second natural number B, and outputs the current detection value of d-axis Idr inputted before the calculation periods (current detection period TIdt) of the second natural number B, at this time calculation period. The adder of d-axis current 34b adds the current detection value of d-axis Idr detected at this time calculation period, and the current detection value of d-axis Idr outputted from the delay device of d-axis current 34a and detected before the addition period Tadd, and outputs the addition value of d-axis current SIdr. The gain multiplier of d-axis current 34c multiplies the gain 0.5 to the addition value of d-axis current SIdr, and outputs the current detection value of d-axis after current addition processing Idr*.

The current detection value of q-axis Iqr detected at this time calculation period (the current detection period TIdt) is inputted into the delay device of q-axis current 34d and the adder of q-axis current 34e. The delay device of q-axis current 34d delays the inputted current detection value of q-axis Iqr by the addition period Tadd and outputs. The delay device of q-axis current 34d is provided with delay devices of the second natural number B, and outputs the current detection value of q-axis Iqr inputted before the calculation periods (current detection period TIdt) of the second natural number B, at this time calculation period. The adder of q-axis current 34e adds the current detection value of q-axis Iqr detected at this time calculation period, and the current detection value of q-axis Iqr outputted from the delay device of q-axis current 34d and detected before the addition period Tadd, and outputs the addition value of q-axis current SIqr. The gain multiplier of q-axis current 34f multiplies the gain 0.5 to the addition value of q-axis current SIqr, and outputs the current detection value of q-axis after current addition processing Iqr*.

2. Embodiment 2

The control apparatus 10 according to Embodiment 2 will be explained. The explanation for constituent parts the same as those in Embodiment 1 will be omitted. The basic configuration of the AC rotary machine 1 and the control apparatus 10 according to the present embodiment is the same as that of Embodiment 1. Embodiment 2 is different from Embodiment 1 in processing of the current addition processing.

In Embodiment 1, the current addition processing is always performed. However, in the present embodiment, only when it is necessary, the current addition processing is performed.

The current addition processing unit 34 calculates the voltage command values of three-phase based on the current detection values after current addition processing, when the on period of the negative electrode side switching device of any phase in the carrier period Tc is less than a preliminarily set threshold value T_th; and calculates the voltage command values of three-phase based on the current detection value detected at this time, when the on period of the negative electrode side switching device of any phase in the carrier period Tc is not less than the threshold value T_th.

<Flowchart>

Figure 14:
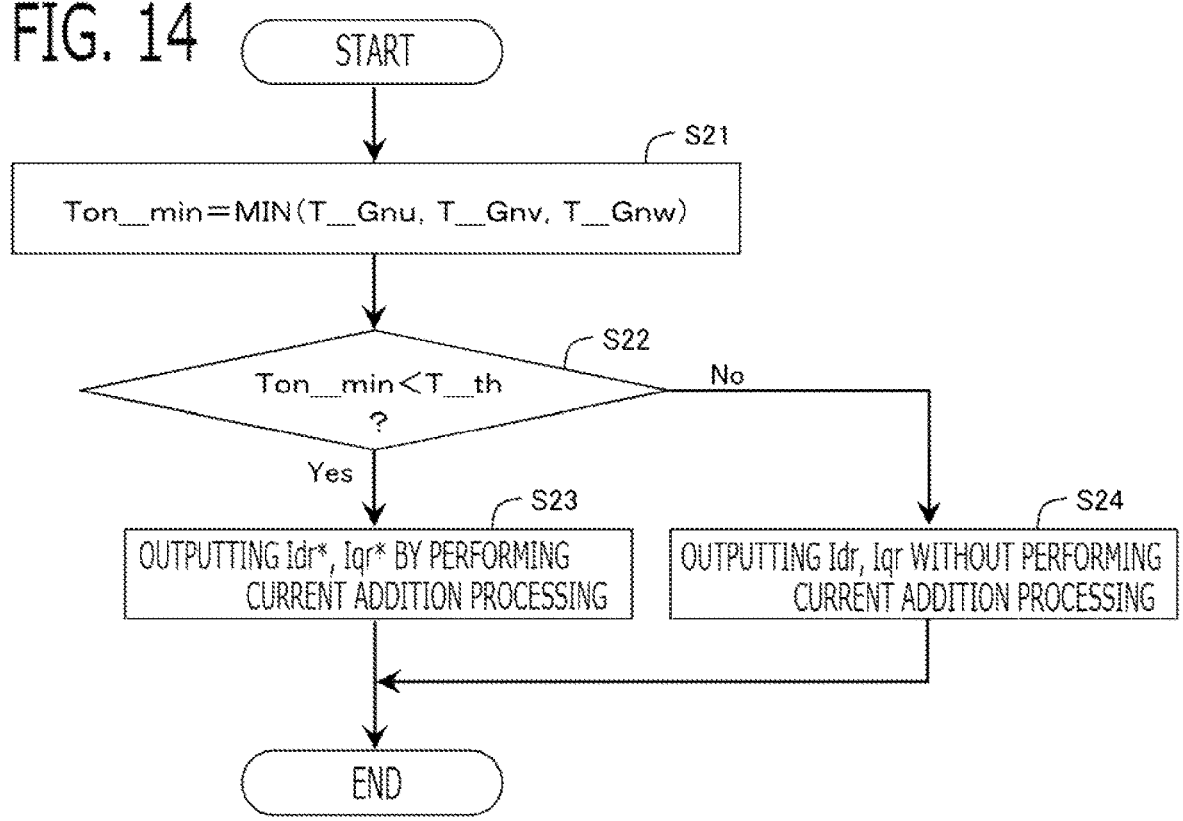
FIG. 14 is a flowchart for explaining the processing of the current addition processing unit according to Embodiment 2.

For example, the current addition processing unit 34 is configured as the flowchart shown in FIG. 14. In the step S21, as shown in the next equation, the current addition processing unit 34 determines the minimum value Ton_min in the on periods T_Gnu, T_Gnv, T_Gnw of the negative electrode side switching devices of respective phases of three-phase in the carrier period Tc.

$$Ton\_min=MIN(T\_Gnu,T\_Gnv,T\_Gnw) \quad (5)$$

For example, the current addition processing unit 34 calculates the on periods T_Gnu, T_Gnv, T_Gnw of the negative electrode side switching devices of respective phases, based on the voltage command values of three-phase Vuo, Vvo, Vwo, and the power source voltage Vdc.

Then, in the step S22, the current addition processing unit 34 determines whether the minimum value Ton_min is less than the threshold value T_th, when it is less, it advances to the step S23, and when it is not less, it advances to the step S24. In the step S23, the current addition processing unit 34 outputs the current detection values of d-axis and q-axis after current addition processing Idr*, Iqr* calculated similar to Embodiment 1, to the voltage command value calculation unit 36. On the other hand, in the step S24, the current addition processing unit 34 outputs the current detection values of d-axis and q-axis Idr, Iqr to which the current addition processing is not performed, to the voltage command value calculation unit 36.

For example, if the carrier period Tc is 50 microseconds, the threshold value T_th is set in a range from 1.5 microseconds to 9.5 microseconds.

In this way, when the on period of the negative electrode side switching device of any one phase becomes shorter than the threshold value T_th and the possibility that ringing occurs at the current detection timing is high, the current addition processing is performed, the component of the resonance period Tr is reduced, and noise is reduced. On the other hand, when the on periods of the negative electrode side switching devices of all phases become longer than the threshold value T_th, the possibility that ringing occurs at the current detection timing is low, and the disturbance of the current detection value is small. Accordingly, the current addition processing adding the past current detection value is not performed, and the phase of the current detection value can be prevented from being delayed.

<Block Diagram>

Figure 15:
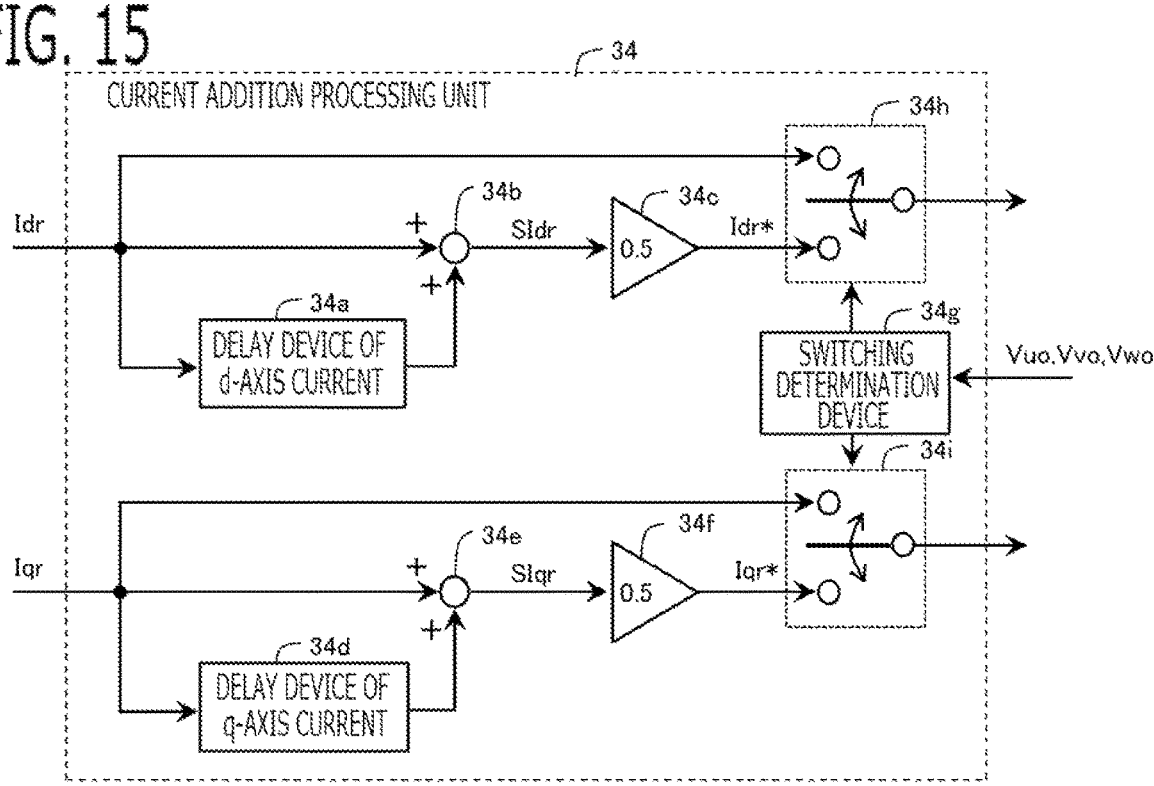
FIG. 15 is a block diagram of the current addition processing unit according to Embodiment 2.

If the current addition processing unit 34 is shown by the block diagram, it will become as FIG. 15. The current addition processing unit 34 is provided with a switching determination device 34g, a switching device of d-axis current 34h, and a switching device of q-axis current 34i, in addition to the delay device of d-axis current 34a to the gain multiplier of q-axis current 34f shown in FIG. 13. Since the delay device of d-axis current 34a to the gain multiplier of q-axis current 34f are similar to Embodiment 1, explanation is omitted.

The switching determination device 34g determines whether the on period of the negative electrode side switching device of any phase in the carrier period Tc is less than the threshold value T_th, by performing the processing similar to the step S21 and the step S22 of FIG. 14.

When the switching determination device 34g determines that it is less than the threshold value T_th, the switching device of d-axis current 34h outputs the current detection value of d-axis after current addition processing Idr* outputted from the gain multiplier of d-axis current 34c. When the switching determination device 34g determines that it is not less than the threshold value T_th, the switching device of d-axis current 34h outputs the current detection value of d-axis Idr detected at this time calculation period. The output value of the switching device of d-axis current 34h is inputted into the voltage command value calculation unit 36.

When the switching determination device 34g determines that it is less than the threshold value T_th, the switching device of q-axis current 34i outputs the current detection value of q-axis after current addition processing Iqr* outputted from the gain multiplier of q-axis current 34f. When the switching determination device 34g determines that it is not less than the threshold value T_th, the switching device of q-axis current 34i outputs the current detection value of q-axis Iqr detected at this time calculation period. The output value of the switching device of q-axis current 34i is inputted into the voltage command value calculation unit 36.

3. Embodiment 3

The control apparatus 10 according to Embodiment 3 will be explained. The explanation for constituent parts the same as those in Embodiment 1 will be omitted. The basic configuration of the AC rotary machine 1 and the control apparatus 10 according to the present embodiment is the same as that of Embodiment 1. Embodiment 3 is different from Embodiment 1 in processing of the current addition processing.

Figure 16:
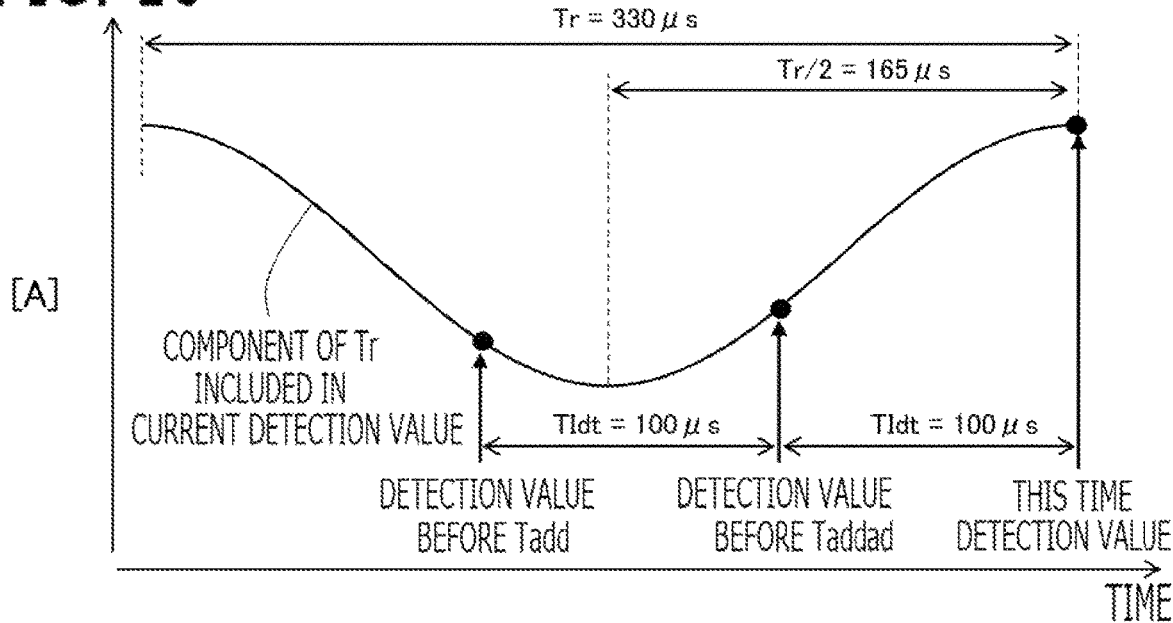
FIG. 16 is a time chart explaining the component of the resonance period included in the current detection value and the addition period according to Embodiment 3.

When the addition period Tadd does not coincide with the half period Tr/2 of the resonance period, the component of the resonance period Tr may not be sufficiently reduced from the current detection value, by the method of Embodiment 1. For example, FIG. 16 shows the schematic waveform of the component of the resonance period Tr included in the current detection value. In this example, the mechanical resonance period Tr of AC rotary machine 1 is 330 microseconds, and the current detection period TIdt is 100 microseconds. The second natural number B is set to 2 so that the addition period Tadd becomes the closest to the half periods 165 microseconds of the resonance period. The addition period Tadd is set to 200 microseconds which is two times of the current detection period TIdt. The addition period Tadd does not coincide with the half period Tr/2 of the resonance period, and its difference is 35 microseconds and becomes large.

Then, in the present embodiment, the current addition processing unit 34 calculates the current detection values after current addition processing, by performing a current addition processing which adds the current detection value detected at this time, the current detection value detected before the addition period Tadd, and the current detection value detected before an additional addition period Taddad which is a third natural number C times of the current detection period TIdt. The third natural number C is set to a natural number that the additional addition period Taddad becomes the second closest to the half period Tr/2 of the mechanical resonance period of AC rotary machine.

In the example of FIG. 16, the third natural number C is set to 1 so that the additional addition period Taddad becomes the second closest to the half periods 165 microseconds of the resonance period, and the additional addition period Taddad is set to 100 microseconds which is one time of the current detection period TIdt.

In this way, even if the addition period Tadd does not coincide with the half period Tr/2 of the resonance period, the half period Tr/2 of the resonance period can be interposed between the addition period Tadd and the additional addition period Taddad. By adding the current detection value detected before the addition period Tadd and the current detection value detected before the additional addition period Taddad, the component of the resonance period Tr of the current detection value can be canceled more effectively.

In the present embodiment, as shown in the next equation, the current addition processing unit 34 calculates an addition value of d-axis current SIdr, by adding the current detection value of d-axis Idr calculated at this time current detection, the current detection value of d-axis Idr calculated at the current detection before the addition period Tadd, and a value obtained by multiplying a gain Kad to the current detection value of d-axis Idr calculated at the current detection before the additional addition period Taddad; and calculates the current detection value of d-axis after current addition processing Idr* by multiplying 1/(2+Kad) to the addition value of d-axis current SIdr. As shown in the next equation, the current addition processing unit 34 calculates the addition value of q-axis current SIqr, by adding the current detection value of q-axis Iqr calculated at this time current detection, the current detection value of q-axis Iqr calculated at the current detection before the addition period Tadd, and a value obtained by multiplying the gain Kad to the current detection value of q-axis Iqr calculated at the current detection before the additional addition period Taddad; and calculates the current detection value of q-axis after current addition processing Iqr* by multiplying 1/(2+

Kad) to the addition value of q-axis current SIqr. The gain Kad is adjusted so that the cancellation effect becomes good.

$$SIdr(t)=Idr(t)+Idr(t-Tadd)+Kad \times Idr(t-Taddad)$$

$$Idr^*(t)=1/(2+Kad) \times SIdr(t)$$

$$SIqr(t)=Iqr(t)+Iqr(t-Tadd)+Kad \times Iqr(t-Taddad)$$

$$Iqr^*(t)=1/(2+Kad) \times SIqr(t) \quad (6)$$

Figure 17:
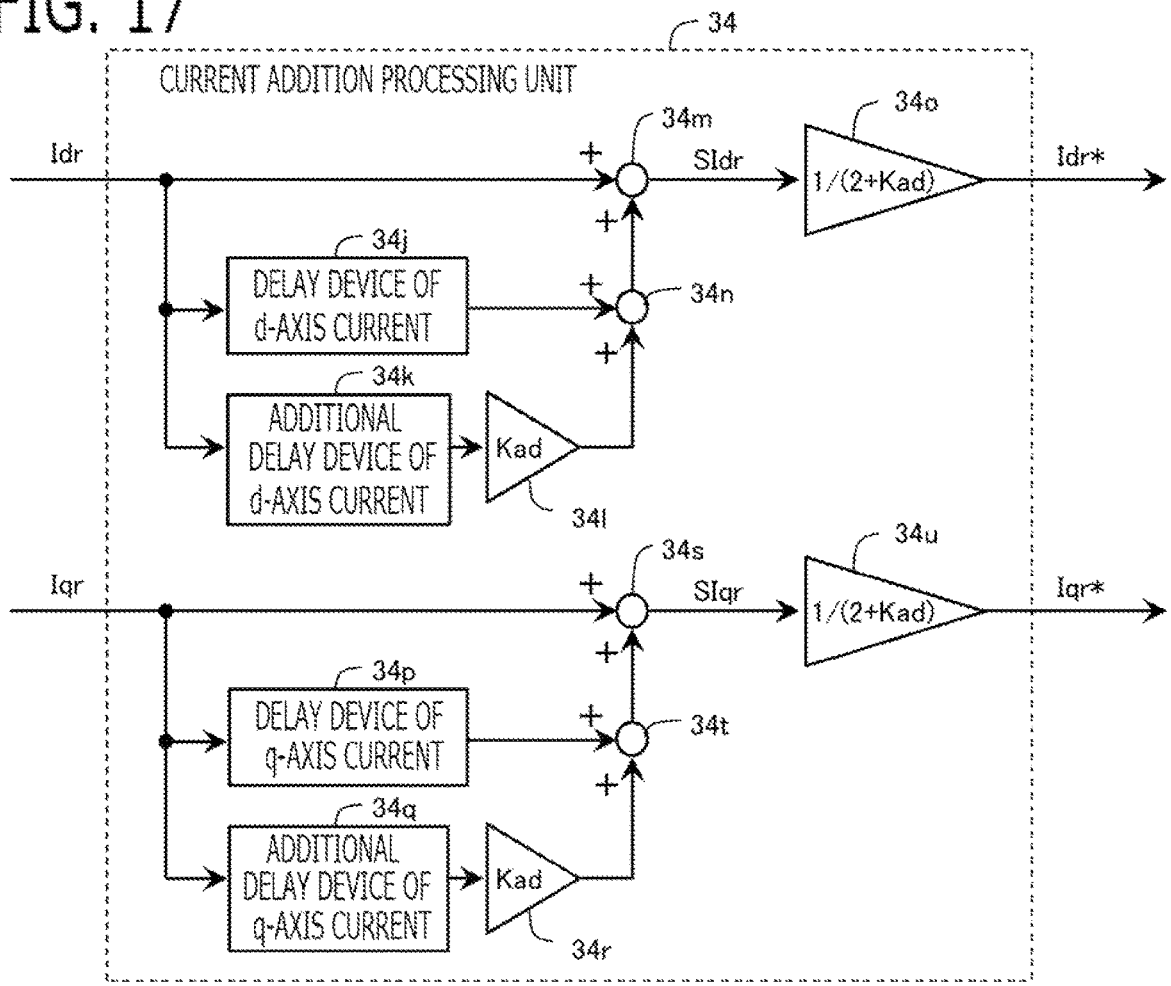
FIG. 17 is a block diagram of the current addition processing unit according to Embodiment 3.

In the present embodiment, as shown in FIG. 17, the current addition processing unit 34 is provided with a delay device of d-axis current 34j, an additional delay device of d-axis current 34k, a gain multiplier of d-axis additional delay device 34l, a first adder of d-axis current 34m, a second adder of d-axis current 34n, a gain multiplier of d-axis current 34o, a delay device of q-axis current 34p, an additional delay device of q-axis current 34q, a gain multiplier of q-axis additional delay device 34r, a first adder of q-axis current 34s, a second adder of q-axis current 34t, and a gain multiplier of q-axis current 34u. The current addition processing unit 34 is a discrete controller which operates every current detection period TIdt, and the calculation period is the current detection period TIdt.

The current detection value of d-axis Idr detected at this time calculation period (the current detection period TIdt) is inputted into the delay device of d-axis current 34j, the additional delay device of d-axis current 34k, and the first adder of d-axis current 34m. The delay device of d-axis current 34j delays the inputted current detection value of d-axis Idr by the addition period Tadd and outputs. The delay device of d-axis current 34j is provided with delay devices of the second natural number B, and outputs the current detection value of d-axis Idr inputted before the calculation periods (current detection period TIdt) of the second natural number B, at this time calculation period. The additional delay device of d-axis current 34k delays the inputted current detection value of d-axis Idr by the additional addition period Taddad and outputs. The additional delay device of d-axis current 34k is provided with delay devices of the third natural number C, and outputs the current detection value of d-axis Idr inputted before the calculation periods (current detection period TIdt) of the third natural number C, at this time calculation period. The gain multiplier of d-axis additional delay device 34l multiplies the gain Kad to the output value of the additional delay device of d-axis current 34k. The second adder of d-axis current 34n adds the output value of the delay device of d-axis current 34j, and the output value of the gain multiplier of d-axis additional delay device 34l. The first adder of d-axis current 34m adds the current detection value of d-axis Idr detected at this time calculation period, and the output value of the second adder of d-axis current 34n, and outputs the addition value of d-axis current SIdr. The gain multiplier of d-axis current 34o multiplies the gain 1/(2+Kad) to the addition value of d-axis current SIdr, and outputs the current detection value of d-axis after current addition processing Idr*.

The current detection value of q-axis Iqr detected at this time calculation period (the current detection period TIdt) is inputted into the delay device of q-axis current 34p, the additional delay device of q-axis current 34q, and the first adder of q-axis current 34s. The delay device of q-axis current 34p delays the inputted current detection value of q-axis Iqr by the addition period Tadd and outputs. The delay device of q-axis current 34p is provided with delay devices of the second natural number B, and outputs the current detection value of q-axis Iqr inputted before the calculation periods (current detection period TIdt) of the second natural number B at this time calculation period. The additional delay device of q-axis current 34q delays the inputted current detection value of q-axis Iqr by the additional addition period Taddad and outputs. The additional delay device of q-axis current 34q is provided with delay devices of the third natural number C, and outputs the current detection value of q-axis Iqr inputted before the calculation periods (current detection period TIdt) of the third natural number C, at this time calculation period. The gain multiplier of q-axis additional delay device 34r multiplies the gain Kad to the output value of the additional delay device of q-axis current 34q. The second adder of q-axis current 34t adds the output value of the delay device of q-axis current 34p, and the output value of the gain multiplier of q-axis additional delay device 34r. The first adder of q-axis current 34s adds the current detection value of q-axis Iqr detected at this time calculation period, and the output value of the second adder of q-axis current 34t, and outputs the addition value of q-axis current SIqr. The gain multiplier of q-axis current 34u multiplies the gain 1/(2+Kad) to the addition value of q-axis current SIqr, and outputs the current detection value of q-axis after current addition processing Iqr*.

<Reduction Effect of Noise>

Figure 18:
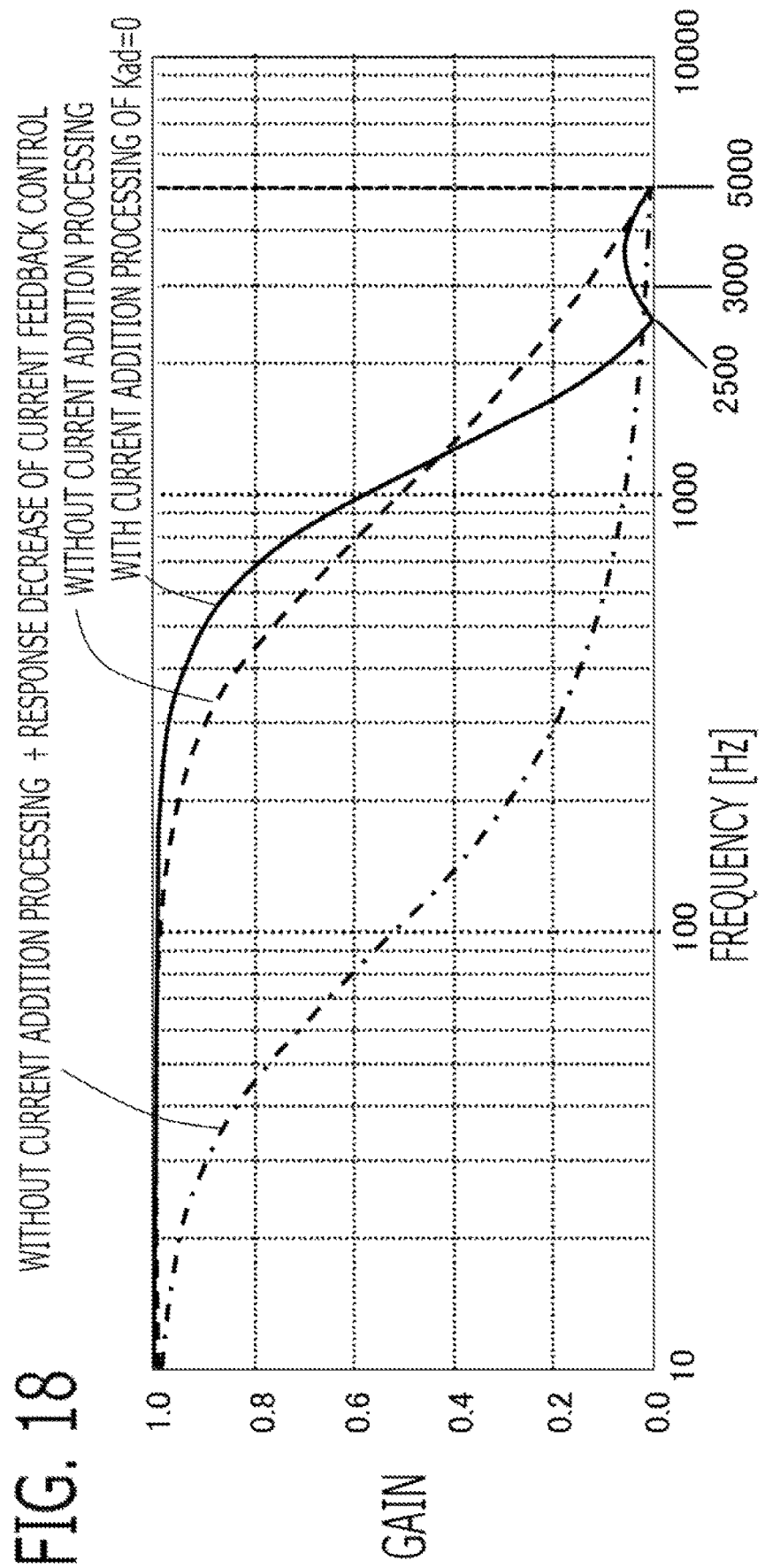
FIG. 18 is a figure showing the transfer characteristic to the noise component of the current detection value according to the comparative example.

In the case of FIG. 16 where the addition period Tadd does not coincide with the half period Tr/2 of the resonance period, the case where the gain Kad is set to 0 and the current detection value detected before the addition period Tadd is added, but the current detection value detected before the additional addition period Taddad is not added is explained. FIG. 18 shows the transfer characteristic from the noise component included in the current detection value of q-axis Iqr to the noise component included in the q-axis current into which the actual winding currents of three-phase were converted on the coordinate system of d-axis and q-axis. The horizontal axis is a frequency of the noise component and the vertical axis is a gain. FIG. 18 shows the transfer characteristic when performing the current addition processing of Kad=0, the transfer characteristic when not performing the current addition processing, and the transfer characteristic when not performing the current addition processing but decreasing the response speed of the current feedback control (the cutoff frequency is set to 1/10). When not decreasing the response speed, the cutoff frequency of the current feedback control is 600 Hz. When decreasing the response speed, the cutoff frequency of the current feedback control is 60 Hz. Since the current detection period TIdt is 100 microseconds, Nyquist frequency is 5000 Hz which is one half of the sampling frequency.

At the frequency of 1200 Hz or higher, compared with the gain when not performing the current addition processing, the gain when performing the current addition processing of Kad=0 becomes lower, and the noise reduction performance is improved. At the frequency of 2500 Hz or higher, the gain when performing the current addition processing of Kad=0 is increasing from 0. At the frequency of 3000 Hz, although the gain when performing the current addition processing of Kad=0 becomes 0.03, the gain when decreasing the response speed of the current feedback control becomes about 0. Accordingly, the noise reduction performance when performing the current addition processing of Kad=0 is inferior to the noise reduction performance when decreasing the response speed of the current feedback control.

Figure 19:
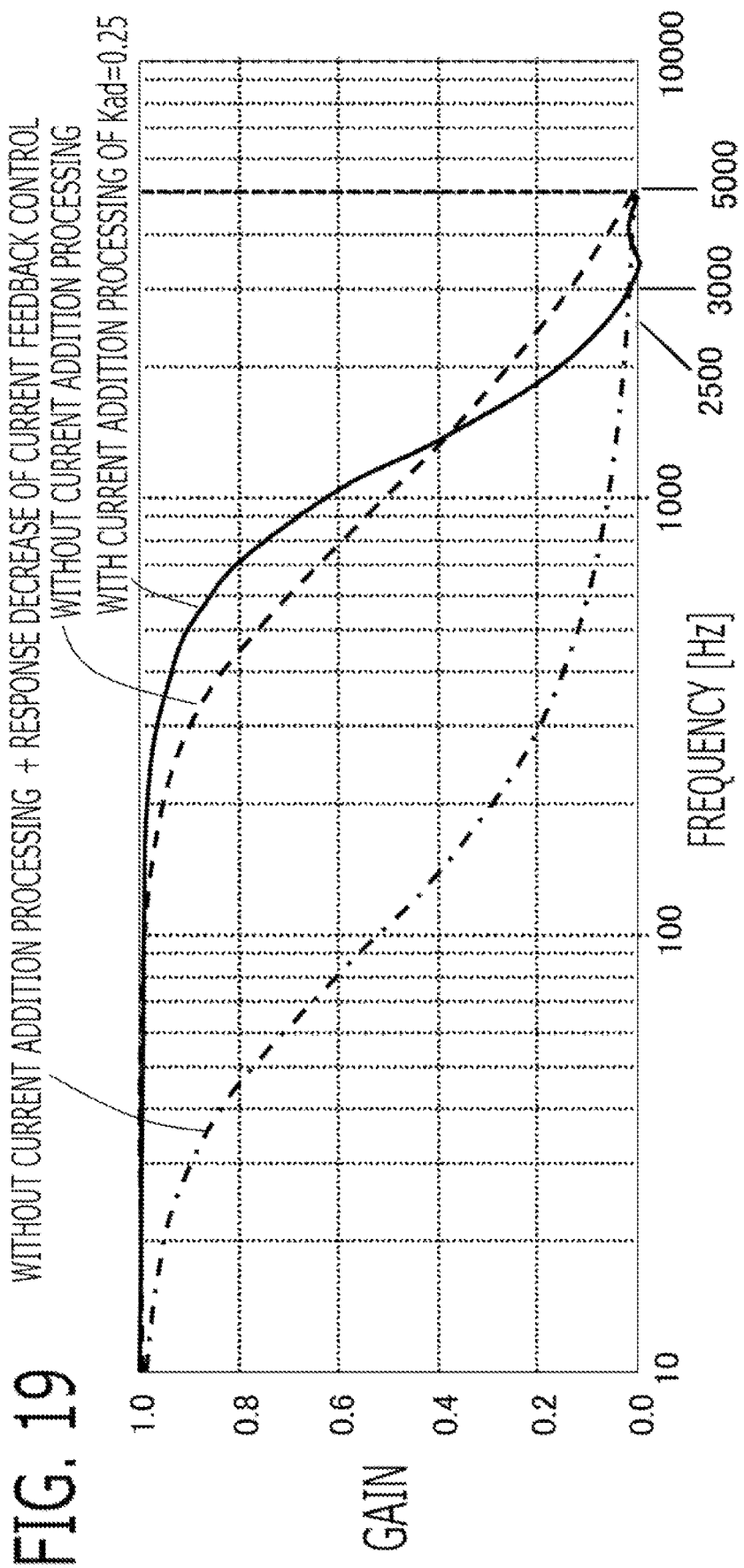
FIG. 19 is a figure showing the transfer characteristic to the noise component of the current detection value according to Embodiment 3.

The case where the gain Kad is set larger than 0 and the current detection value detected before the additional addition period Taddad is added in addition to the current detection value detected before the addition period Tadd is explained. FIG. 19 shows the transfer characteristic when performing the current addition processing of Kad=0.25, the transfer characteristic when not performing the current addition processing, and the transfer characteristic when not performing the current addition processing but decreasing the response speed of the current feedback control (the cutoff frequency is set to 1/10).

When performing the current addition processing of Kad=0.25, the increase in the gain can be suppressed at the frequency of 2500 Hz or higher. At the frequency of 3000 Hz, the gain becomes about 0, and the noise reduction performance equivalent to the case where the response speed of the current feedback control is decreased can be realized. Accordingly, even in the case where the addition period Tadd does not coincide with the half period Tr/2 of the resonance period, by adding the current detection value detected before the additional addition period Taddad which is the second closest to the half period Tr/2 of the resonance period, the reduction effect of the component of the resonance period Tr of the current detection value can be increased.

If the gain Kad is set larger than 0.25, the noise reduction performance in the high frequency region is improved more than the transfer characteristic of FIG. 19, and if the gain Kad is set smaller than 0.25, the noise reduction performance in the low frequency region is improved more than the transfer characteristic of FIG. 19. Accordingly, the gain Kad may be adjusted according to the required noise reduction performance. Herein, although the cutoff frequency of the current feedback control is set to 600 Hz, it may be set less than or equal to the half of the resonance frequency. For example, if the resonance frequency is 3000 Hz (Tr=330 microseconds), the cutoff frequency should may be set less than or equal to 1500 Hz, and if the resonance frequency is 2500 Hz (Tr=400 microseconds), the cutoff frequency may be set less than or equal to 1250 Hz.

4. Embodiment 4

The control apparatus 10 according to Embodiment 4 will be explained. The explanation for constituent parts the same as those in Embodiment 1 will be omitted. The basic configuration of the AC rotary machine 1 and the control apparatus 10 according to the present embodiment is the same as that of Embodiment 1. Embodiment 4 is different from Embodiment 1 in that the AC rotary machine 1 and the control apparatus 10 constitute an electric power steering apparatus 100.

In the above embodiments 1 to 3, application of the AC rotary machine 1 and the control apparatus 10 is not specified. In the present embodiment, the AC rotary machine 1 and the control apparatus constitute the electric power steering apparatus 100. The electric power steering apparatus 100 is provided with the control apparatus for AC rotary machine 10, the AC rotary machine 1, and a driving force transmission mechanism 101 that transmits driving force of the AC rotary machine 1 to a steering device 102 of a vehicle.

Figure 20:
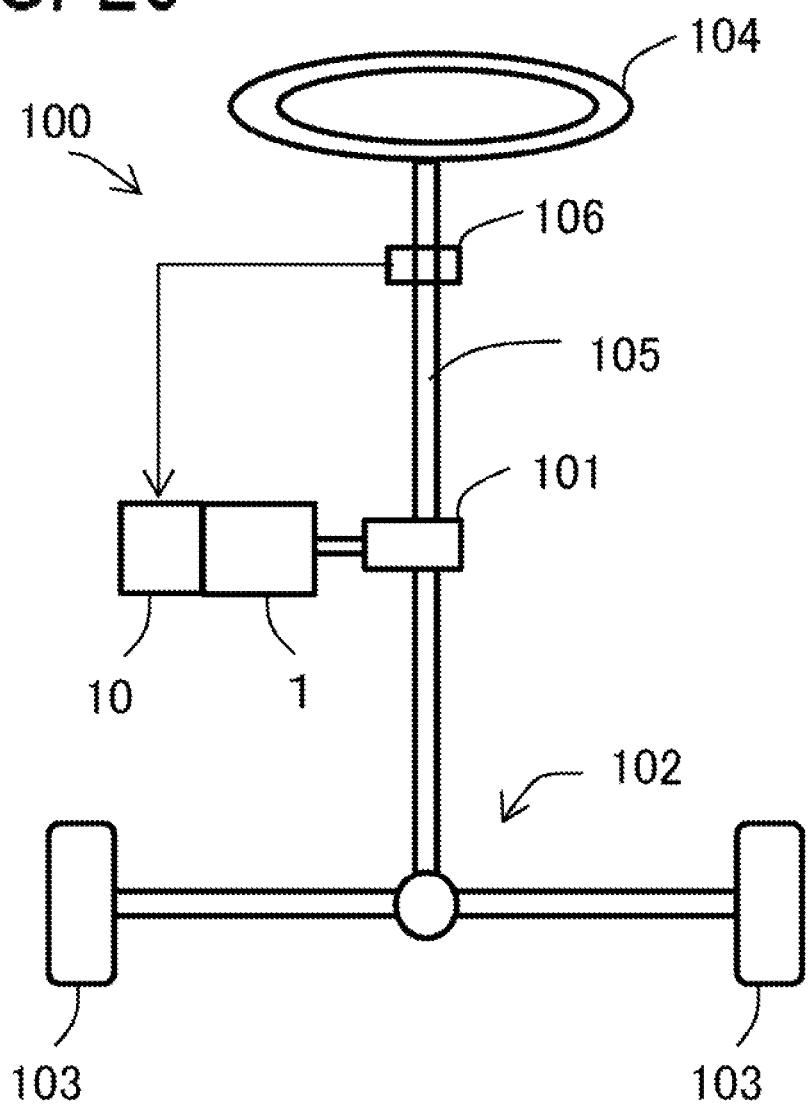
FIG. 20 is a schematic configuration diagram of the electric power steering apparatus according to Embodiment 4.

FIG. 20 shows the schematic configuration diagram of the electric power steering apparatus 100 according to the present embodiment. The rotation axis of the rotor of the AC rotary machine 1 is connected with the steering device 102 of the wheels 103 via the driving force transmission mechanism 101. For example, the electric power steering apparatus 100 is provided with a handle 104 that a driver rotates right and left, a shaft 105 that is connected with the handle 104 and transmits a steering wheel torque by the handle 104 to the steering device 102 of the wheels 103, a torque sensor 106 that is mounted on the shaft 105 and detects a steering torque Ts by the handle 104, and a driving force transmission mechanisms 101, such as a worm gear mechanism, which connects the rotation axis of the AC rotary machine 1 with the shaft 105. The output signal of the torque sensor 106 is inputted into the control apparatus 10 (the input circuit 92).

The current command value calculation unit 35 calculates a torque command value Tref, based on the steering torque Ts detected based on the output signal of the torque sensor 106. Then, similar to Embodiment 1, the current command value calculation unit 35 calculates the current command values of d-axis and q-axis Ido, Iqo, based on the torque command value Tref, the power source voltage Vdc, the rotational angle speed ω, and the like.

The mechanical resonance of AC rotary machine 1 occurs in the frame of AC rotary machine 1, or the power pack which integrated the AC rotary machine 1, the inverter 4, and the controller 6, or the electric power steering apparatus 100 which includes the frame or the power pack, and the gear mechanism.

For example, in the electric power steering apparatus 100, the mechanical resonance period Tr of AC rotary machine 1 becomes in a range from 200 microseconds to 500 microseconds (the resonance frequency becomes in a range from 2 kHz to 5 kHz). Preferably, the resonance period Tr may become in a range from 300 microseconds to 400 microseconds (the resonance frequency may become in a range from 2.5 kHz to 3.3 kHz). In this case, the cutoff frequency of the current feedback control may be set in a range from 100 Hz to 1250 Hz. Preferably, the cutoff frequency may be set in a range from 200 Hz to 800 Hz. In this case, if the carrier period Tc is set less than or equal to 60 microseconds, the component of the resonance period Tr can be reduced well from the current detection value by the current addition processing, while maintaining the performance of the current feedback control, the noise generated from the AC rotary machine 1 can be reduced, and the electric power steering apparatus 100 with low noise can be obtained.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In above-mentioned Embodiment 4, there was explained the case where the AC rotary machine 1 and the control apparatus 10 are used for the electric power steering apparatus 100. However, the AC rotary machine 1 and the control apparatus 10 may be used for various kinds of applications, such as being used for the power device of wheel.

(2) In above-mentioned Embodiment 2, there was explained the case where the current addition processing unit 34 switches and outputs the current detection values after current addition processing calculated by the current addition processing similar to Embodiment 1, and the current detection value detected at this time. However, the current addition processing unit 34 may switch and output the current detection values after current addition processing calculated by the current addition processing similar to Embodiment 3, and the current detection value detected at this time.

(3) In each of the above-mentioned embodiments, there was explained the case where the modulation unit 363 adds the modulation explained using the equation (1). However, the modulation unit 363 may perform various kinds of modulation other than the equation (1) which causes the current detection error due to ringing. For example, as shown in the next equation, the modulation unit 363 may determine the minimum value Vmin and the maximum value Vmax among the voltage command values of three-phase after coordinate conversion Vuoc, Vvoc, Vwoc; calculate an offset voltage Voff by multiplying 0.5 to an addition value of the minimum value Vmin and the maximum value Vmax; and calculate the voltage command values of three-phase Vuo, Vvo, Vwo by subtracting the offset voltage Voff from the voltage command values of three-phase after coordinate conversion Vuoc, Vvoc, Vwoc.

$$V\min=\mathrm{MIN}(Vuoc, Vvoc, Vwoc)$$

$$V\max=\mathrm{MAX}(Vuoc, Vvoc, Vwoc)$$

$$V\mathrm{off}=0.5\times(V\min+V\max)$$

$$Vuo=Vuoc-V\mathrm{off}$$

$$Vvo=Vvoc-V\mathrm{off}$$

$$Vwo=Vwoc-V\mathrm{off} \quad (7)$$

Figure 21:
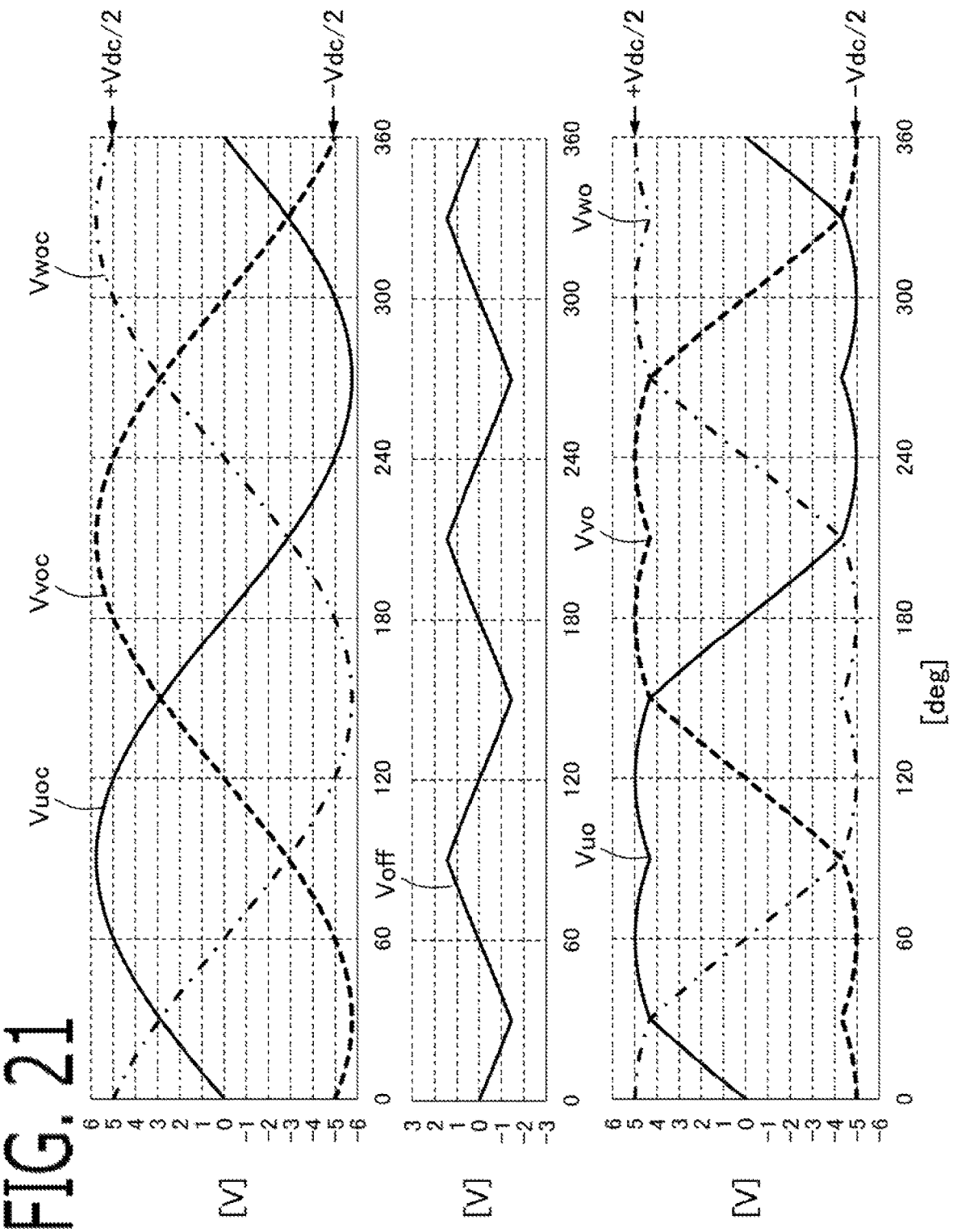
FIG. 21 is a time chart which shows the behavior of the voltage command values of three-phase by the amplitude reduction modulation according to other embodiments.

FIG. 21 shows the behavior of the amplitude reduction modulation of the equation (7). The voltage command values of three-phase after coordinate conversion Vuoc, Vvoc, Vwoc are shown in the upper row graph. The voltage command values of three-phase after coordinate conversion Vuoc, Vvoc, Vwoc exceed a range of −Vdc/2 to +Vdc/2, and the voltage saturation occurs. On the other hand, the voltage command values of three-phase after amplitude reduction modulation Vuo, Vvo, Vwo are kept in the range from −Vdc/2 to +Vdc/2, and the occurrence of voltage saturation can be prevented. Even if this kind modulation is performed, when the voltage command value approaches +Vdc/2 and the on period of the negative electrode side switching device becomes short, the current detection error is caused by ringing. Accordingly, by performing the current addition processing, the component of the resonance period Tr can be reduced from the current detection value, and the noise of AC rotary machine 1 can be reduced.

(4) In each of the above-mentioned embodiments, there was explained the case where the current addition processing unit 34 performs the current addition processing to the current detection values of d-axis and q-axis Idr, Iqr. However, the current addition processing unit 34 may perform the current addition processing to the current detection values of three-phase Iur, Ivr, Iwr. For example, in the configuration corresponding to Embodiment 1, the current addition processing unit 34 calculates the current detection values of three-phase after current addition processing Iur*, Ivr*, Iwr*, by performing the current addition processing which adds the current detection values of three-phase Iur, Ivr, Iwr detected at this time current detection, and the current detection values of three-phase Iur, Ivr, Iwr detected at the current detection before the addition period Tadd, respectively. In the configuration corresponding to Embodiment 3, the current addition processing unit 34 calculates the current detection values of three-phase after current addition processing Iur*, Ivr*, Iwr*, by performing the current addition processing which adds the current detection values of three-phase Iur, Ivr, Iwr detected at this time current detection, the current detection values of three-phase Iur, Ivr, Iwr detected at the current detection before the addition period Tadd, and the current detection values of three-phase Iur, Ivr, Iwr detected at the current detection before the additional addition period Taddad. Current detection values of three-phase after current addition processing Iur*, Ivr*, and Iwr* are calculated. Then, the current coordinate conversion unit 33 converts the current detection values of three-phase after current addition processing Iur*, Ivr*, Iwr* into the current detection values of d-axis and q-axis after current addition processing Idr*, Iqr*, by performing the three-phase/two-phase conversion and the rotating coordinate conversion based on the magnetic pole position θ, and outputs to the voltage command value calculation unit 36.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 AC Rotary Machine, 3 DC power Source, 4 Inverter, 5 Current Detection Circuit, 6 Control apparatus 10 Control apparatus for AC Rotary Machine, 100 Electric Power Steering Apparatus, 101 Driving Force Transmission Mechanism, 102 Steering Apparatus, A First natural number, B Second natural number, C Third natural number, CA Carrier wave, TIdt Current detection period, T_th Threshold value, Tadd Addition period, Taddad Additional addition period, Tc Carrier period, Tr Resonance period, Vdc power source voltage

What is claimed is:

1. A control apparatus for AC rotary machine that controls an AC rotary machine which has three-phase windings, the control apparatus for AC rotary machine comprising:
   an inverter that is provided with three sets of series circuits in each of which a positive electrode side switching device connected to a positive electrode side of a DC power source and a negative electrode side switching device connected to a negative electrode side of the DC power source are connected in series and a connection node of series connection is connected to the winding of the corresponding phase, corresponding to respective phases of the three-phase windings;
   a current detection circuit that is provided with resistances connected in series to the negative electrode side switching devices of at least two phases; and
   a controller that calculates voltage command values of the three-phases, and controls on/off the switching devices by comparing each of the voltage command values of three-phase with a carrier wave vibrating at a carrier period,
   wherein the controller detects currents flowing into the three-phase windings, based on an output signal of the current detection circuit, at every current detection timing which is set every current detection period which is a first natural number times of the carrier period and at which the negative electrode side switching device is turned on; calculates current detection values after current addition processing, by performing a current addition processing which adds current detection values detected at a present current detection timing, and current detection values detected at a first past current detection timing, wherein the first past current detection timing is before the present current detection timing by an addition period which is a second natural number times of the current detection period; and calculates the voltage command values of the three-phases based on the current detection values after the current addition processing, wherein the second natural number is set so that the addition period becomes closest to a half period of a mechanical resonance period of the AC rotary machine.

2. The control apparatus for AC rotary machine according to claim 1, wherein, with respect to each phase of the three phases, the controller turns on the negative electrode side switching device, when the carrier wave exceeds the voltage command value, and turns off the negative electrode side switching device, when the carrier wave is less than the voltage command value;

and detects current at the every current detection timing when the carrier wave becomes a peak point of mountain.

3. The control apparatus for AC rotary machine according to claim 1, wherein the controller, at every current detection timing, converts the current detection values of the three-phase windings into current detection values of d-axis and q-axis on a coordinate system of d-axis and q-axis which rotates synchronizing with a magnetic pole position of a rotor of the AC rotary machine; calculates current detection values of d-axis and q-axis after current addition processing, by performing a current addition processing which adds the current detection values of d-axis and q-axis calculated at the present current detection timing, and the current detection values of d-axis and q-axis calculated at the first past current detection timing, respectively; and calculates the voltage command values of the three-phases, based on the current detection values of d-axis and q-axis after current addition processing.

4. The control apparatus for AC rotary machine according to claim 1, wherein the controller calculates current detection values after current addition processing, by performing a current addition processing which adds the current detection values detected at the present current detection timing, the current detection values detected at the first past current detection timing, and the current detection values detected at a second past current detection timing, wherein the second past current detection timing is before the present current detection timing by an additional addition period which is a third natural number times of the current detection period, wherein the third natural number is set to a natural number that the additional addition period becomes the second closest to the half period of the mechanical resonance period of the AC rotary machine.

5. The control apparatus for AC rotary machine according to claim 1, wherein, when an on period of the negative electrode side switching device of any phase of the three phases in the carrier period is less than a preliminarily set threshold value, the controller calculates the voltage command values of the three-phases based on the current detection values after current addition processing; and when the on period of the negative electrode side switching device of any phase of the three phases in the carrier period is not less than the threshold value, the controller calculates the voltage command values of the three-phases based on the current detection value detected at the present current detection timing.

6. The control apparatus for AC rotary machine according to claim 1, wherein the controller offsets the voltage command values of the three-phases equally so that an average value of the voltage command values of the three-phases becomes less than a vibration center value of the carrier wave, and controls on/off the switching devices by comparing each of the voltage command values of the three-phases after offset and the carrier wave.

7. An electric power steering apparatus comprising:

the control apparatus for AC rotary machine according to claim 1;

the AC rotary machine; and a driving force transmission mechanism that transmits a driving force of the AC rotary machine to a steering device of a vehicle, wherein the carrier period is set less than or equal to 60 microseconds, and wherein the mechanical resonance period of the AC rotary machine is within a range from 200 microseconds to 500 microseconds.

* * * * *